US008009159B2

(12) United States Patent
Hiroki et al.

(10) Patent No.: US 8,009,159 B2

(45) Date of Patent: Aug. 30, 2011

(54) SEMICONDUCTOR DISPLAY DEVICE AND METHOD OF DRIVING A SEMICONDUCTOR DISPLAY DEVICE

(75) Inventors: Masaaki Hiroki, Kanagawa (JP); Eiji Sato, Kanagawa (JP); Shigeru Onoya, Kanagawa (JP); Noboru Inoue, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1272 days.

(21) Appl. No.: 11/586,281

(22) Filed: Oct. 25, 2006

(65) Prior Publication Data

US 2007/0040823 A1 Feb. 22, 2007

Related U.S. Application Data

(62) Division of application No. 09/905,542, filed on Jul. 13, 2001, now Pat. No. 7,142,203.

(30) Foreign Application Priority Data

Jul. 14, 2000 (JP) ................................ 2000-214087

(51) Int. Cl.
*G06F 3/038* (2006.01)

(52) U.S. Cl. ...................................................... 345/209

(58) Field of Classification Search ............ 345/96–100, 345/209

See application file for complete search history.

(56) References Cited

U.S. PATENT DOCUMENTS 4,630,034 A * 12/1986 Takahashi ..................... 341/106
5,365,284 A * 11/1994 Matsumoto et al. .......... 348/793
5,643,826 A 7/1997 Ohtani et al.
5,790,092 A 8/1998 Moriyama
5,844,538 A * 12/1998 Shiraki et al. .................. 345/98
5,847,688 A 12/1998 Ohi et al.
5,923,962 A 7/1999 Ohtani et al.

(Continued)

FOREIGN PATENT DOCUMENTS

JP 61-069283 4/1986

(Continued)

OTHER PUBLICATIONS

Rabeler, U. et al, "Frame-Rate Converter and High Speed SDRAM Memory Controller for Digital Multi-Media Projectors," EuroDisplay '99: Proceedings of the 19th International Display Research Conference, Sep. 6-9, 1999, Berlin, Germany, SID '99 Digest, pp. 347-350.

*Primary Examiner* — Richard Hjerpe
*Assistant Examiner* — Carolyn R Edwards
(74) *Attorney, Agent, or Firm* — Husch Blackwell LLP

(57) ABSTRACT

A semiconductor display device capable of performing clear display of a high definition image, in which flicker, vertical stripes, horizontal stripes, and diagonal stripes are unlikely to be seen by an observer, is provided. An image signal input from the outside to a RAM of a frame conversion portion in a semiconductor display device is written in, and the written in image signal is read out two times, in order. A period for reading out the image signal input to the RAM one time is shorter than a period for writing in the image signal to the RAM. The electric potentials of display signals input to each pixel in two consecutive frame periods are inverted, with the electric potential of opposing electrodes (opposing electric potential) as a reference, whereby the same image is displayed in a pixel portion in the two consecutive frame periods.

15 Claims, 25 Drawing Sheets

U.S. PATENT DOCUMENTS

| | | | | |
|---|---|---|---|---|
| 5,942,856 | A | 8/1999 | Koyama | |
| 6,014,126 | A * | 1/2000 | Nishihara | 345/698 |
| 6,049,321 | A | 4/2000 | Sasaki | |
| 6,166,725 | A | 12/2000 | Isami et al. | |
| 6,243,064 | B1 * | 6/2001 | Hirakata | 345/96 |
| 6,285,042 | B1 | 9/2001 | Ohtani et al. | |
| 6,295,043 | B1 * | 9/2001 | Hashimoto et al. | 345/96 |
| 6,335,541 | B1 | 1/2002 | Ohtani et al. | |
| 6,340,970 | B1 * | 1/2002 | Furuhashi et al. | 345/213 |
| 6,628,253 | B1 | 9/2003 | Hiroki | |
| 6,650,311 | B1 | 11/2003 | Mori | |
| 6,998,639 | B2 | 2/2006 | Ohtani et al. | |

FOREIGN PATENT DOCUMENTS

| | | |
|---|---|---|
| JP | 1-188181 | 7/1989 |
| JP | 07-130652 | 5/1995 |
| JP | 8-166775 | 6/1996 |
| JP | 9-204159 | 8/1997 |

* cited by examiner

| | | | | | | |
|---|---|---|---|---|---|---|
| (1,1) | (1,2) | (1,3) | (1,4) | (1,5) | | (1,x) |
| (2,1) | (2,2) | (2,3) | (2,4) | (2,5) | | (2,x) |
| (3,1) | (3,2) | (3,3) | (3,4) | (3,5) | | (3,x) |
| | | | | | | |
| (y,1) | (y,2) | (y,3) | (y,4) | (y,5) | | (y,x) |

| | | | | | |
|---|---|---|---|---|---|
| (1,1) | (1,2) | (1,3) | (1,4) | (1,5) | (1,6) |
| (2,1) | (2,2) | (2,3) | (2,4) | (2,5) | (2,6) |
| (3,1) | (3,2) | (3,3) | (3,4) | (3,5) | (3,6) |
| (4,1) | (4,2) | (4,3) | (4,4) | (4,5) | (4,6) |

SEMICONDUCTOR DISPLAY DEVICE AND METHOD OF DRIVING A SEMICONDUCTOR DISPLAY DEVICE

This application is a divisional of U.S. application Ser. No. 09/905,542 filed Jul. 13, 2001 now U.S. Pat. No. 7,142,203.

BACKGROUND OF THE INVENTION

1. Field of the Invention

The present invention relates to a suitable method of driving a semiconductor display device using a display medium such as liquid crystals or EL (electro luminescence), and to a semiconductor display device using the driving method. Furthermore, the present invention relates to an electronic device using the semiconductor device display device.

2. Description of the Related Art

Techniques for manufacturing elements formed using semiconductor thin films on an insulating substrate, for example a thin film transistor (TFT), have advanced rapidly in recent years. The reason for these advancements is that the need for semiconductor display devices (typically active matrix liquid crystal display devices) has increased.

An active matrix liquid crystal display device is a device which displays an image by controlling the electric charge applied to between several hundreds of thousands and several millions of pixels, arranged in a matrix shape, by using pixel switching elements formed by transistors (pixel transistors).

Note that, throughout this specification, the term pixel refers to a structure which is mainly structured by a switching element, a pixel electrode connected to the switching element, an opposing electrode, and a passive element formed between the pixel electrode and the opposing electrode (such as a liquid crystal or electro luminescence material).

A typical example of the display operation of a liquid crystal panel of an active matrix liquid crystal display device is explained simply below using FIGS. 26A and 26B. FIG. 26A is a top surface diagram of a liquid crystal panel, and FIG. 26B is a diagram showing an arrangement of pixels.

A source signal line driver circuit 701 and source signal lines S1 to S6 are connected. Further, a gate signal line driver circuit 702 and gate signal lines G1 to G4 are connected. A plurality of pixels 703 are formed in portions surrounded by the source signal lines S1 to S6 and the gate signal lines G1 to G4. A pixel TFT 704 and a pixel electrode 705 are formed in each of the pixels 703. Note that the number of source signal lines and gate signal lines is not limited to the value shown here.

An image signal is input to the source signal line driver circuit 701 from an IC (not shown in the figures) formed external to the panel.

The image signal input to the source signal line driver circuit 701 is sampled, and is input to the source signal line S1 as a display signal. Further, the gate signal line G1 is selected in accordance with a selection signal input to the gate signal line G1 from the gate signal line driver circuit 702, and all of the pixel TFTs 704 having their gate electrode connected to the gate signal line G1 are placed in an ON state. The display signal input to the source signal line S1 is then input to the pixel electrode 705 of a pixel (1,1) through the pixel TFT 704. Liquid crystals are driven by the electric potential of the input display signal, the amount of light transmitted is controlled, and a portion of an image (image corresponding to the pixel (1,1)) is displayed.

While maintaining the state in which the image is displayed in the pixel (1,1) by using means such as a storage capacitor (not shown in the figure), the image signal input to the source signal line driver circuit 701 is sampled in the next instant, and is input to the source signal line S2 as a display signal. Note that the term storage capacitor refers to a capacitance for storing the electric potential of a display signal input to the gate electrode of the pixel TFT 704 for a fixed period.

The gate signal line G1 remains in its selected state, and the pixel TFT 704 of a pixel (1,2) of a portion at which the gate signal line G1 and the source signal line S2 intersect is placed in an on state. The display signal input to the source signal line S2 is then input to the pixel electrode 705 of the pixel (1,2) through the pixel TFT 704. Liquid crystals are driven by the electric potential of the input display signal, the amount of light transmitted is controlled, and a portion of an image (image corresponding to the pixel (1,2)) is displayed, similar to the display in the pixel (1,1).

These display operations are performed in order, and portion of the image are displayed one after another in all of the pixels (1,1), (1,2), (1,3), (1,4), (1,5), and (1,6) connected to the gate signal line G1. The gate signal line G1 continues to be selected during this period in accordance with the selection signal input to the gate signal line G1.

The gate signal line G1 becomes deselected when the display signal is input to all of the pixels connected to the gate signal line G1. Continuing, the gate signal line G2 is selected in accordance with a selection signal input to the gate signal line G2. Portions of the image are then display in order in all pixels (2,1), (2,2), (2,3), (2,4), (2,5), and (2,6) connected to the gate signal line G2. The gate signal line G2 continues to be selected during this period.

One image is displayed in a pixel portion 706 by repeating the above operations for all of the gate signal lines in order. A period during which the one image is displayed is referred to as one frame period. The period during which one image is displayed in the pixel portion 706 may also be combined with a vertical return period and taken as one frame period. The state in which the image is displayed is then maintained by means such as the storage capacitor (not shown in the figures) for all of the pixels until the pixel TFT of each pixel is again placed in an ON state.

Normally, in order to prevent degradation of the liquid crystals, the polarity of the electric potential of the signals input to each of the pixels is inverted (alternating current drive) with the electric potential of the opposing electrodes (opposing electric potential) as a reference for liquid crystal panels using TFTs as switching elements. Frame inversion drive, source line inversion drive, gate line inversion drive, and dot inversion drive can be given a method of alternating current drive. Each method is explained below.

A polarity pattern of an image signal (hereafter referred to simply as a polarity pattern) input to each pixel in frame inversion drive is shown in FIG. 27A. Note that cases in which the electric potential of the display signal input to a pixel is positive with respect to the opposing electric potential are shown by the symbol "+", and cases in which the electric potential of the display signal input to a pixel is negative with respect to the opposing electric potential are shown by the symbol "−" in the figures displaying polarity patterns (FIGS. 27A to 27D, and FIGS. 6 to 9) within this specification. Further, the polarity pattern shown in FIGS. 27A to 27D correspond to the pixel arrangement shown in FIG. 26B.

Note that, in this specification, the term display signal having positive polarity denotes a display signal having an electric potential higher than the opposing electric potential. Further, the term display signal having a negative polarity denotes a display signal having an electric potential lower than the opposing electric potential.

In addition, there is interlaced scanning as a scanning method in which scanning is divided into two times (two fields) during one screen (one frame) by odd numbered gate signal lines and even numbered gate signal lines, and there is non-interlaced scanning in which the odd numbered and even numbered gate signal lines are not divided, with scanning performed in order. An example of using mainly non-interlaced scanning is explained here.

With frame inversion drive, display signals having the same polarity are input to all of the pixels within an arbitrary frame period (polarity pattern 1), and then the polarity of the display signals input to all of the pixels is inverted (polarity pattern 2), and display is performed. In other words, by focusing on only the polarity patterns, frame inversion drive is a method of drive in which two types of polarity patterns (the polarity pattern 1 and the polarity pattern 2) are repeated every other frame period. Note that, in this specification, the term display signal input to a pixel denotes the display signal being input to a pixel electrode through a pixel TFT.

Source line inversion drive is explained next. A pixel polarity pattern in source line inversion drive is shown in FIG. 27B.

With source line inversion drive, display signals having the same polarity are input to all pixels connected to the same source signal line in an arbitrary frame period, and display signals having the inverse polarity are input to pixels connected to adjacent source signal lines, as shown in FIG. 27B. Note that, in this specification, the term pixels connected to a source signal line denotes pixels having a source region of a drain region of their pixel TFT connected to the source signal line.

Display signals having polarities which are the inverse of those of the arbitrary frame period are then input to each source signal line in the next frame period. Therefore, if the polarity pattern in the arbitrary frame period is taken as a polarity pattern 3, then the polarity pattern in the next frame period becomes a polarity pattern 4.

Gate line inversion drive is explained next. A pixel polarity pattern in gate line inversion drive is shown in FIG. 27C.

With gate line inversion drive, display signals having the same polarity are input to all pixels connected to the same gate signal line in an arbitrary frame period, and display signals having the inverse polarity are input to pixels connected to adjacent gate signal lines, as shown in FIG. 27C. Note that, in this specification, the term pixels connected to a gate signal line denotes pixels having the gate electrode of their pixel TFT connected to the gate signal line.

Display signals having polarities which are the inverse of those of the arbitrary frame period are then input to the pixels connected to each gate signal line in the next frame period. Therefore, if the polarity pattern in the arbitrary frame period is taken as a polarity pattern 5, then the polarity pattern in the next frame period becomes a polarity pattern 6.

In other words, gate line inversion drive is a driving method in which two types of polarity patterns (the polarity pattern 5 and the polarity pattern 6) are repeatedly displayed every other frame period, similar to source line inversion drive.

Dot inversion drive is explained next. A polarity pattern in dot inversion drive is shown in FIG. 27D.

Dot line inversion drive is a method in which the polarity of display signals input to the pixels is inverted for all adjacent pixels, as shown in FIG. 27*d*. Display signals in an arbitrary frame period, having polarities which are the inverse of the display signals of the preceding frame period, are input to each pixel. Therefore, if the polarity pattern in the arbitrary frame period is taken as a polarity pattern 7, then the polarity pattern in the next frame period becomes a polarity pattern 8. Namely, dot inversion drive is a driving method in which two types of polarity patterns are repeatedly displayed every other frame period.

The above alternating current drive methods are effective in preventing deterioration of liquid crystals. However, there are times when screen flicker, vertical stripes, horizontal stripes, or diagonal stripes are visible if the above alternating current drive methods are used.

It is thought that this is because, even if display of the same gray scale is performed in each pixel, display is performed when the polarity of the input display signal is positive, and when the polarity of the input display signal is negative, and there are minute differences in the screen brightness. This phenomenon is explained in detail below, using an example of frame inversion drive.

A timing chart for the active matrix liquid crystal display device shown in FIG. 26 being driven by frame inversion drive is shown in FIG. 28. Note that FIG. 28 is a timing chart for a case in which there is white display if the active matrix liquid crystal display device is normally black, and there is black display if the active matrix liquid crystal display device is normally white. A period during which a selection signal is input to one gate signal line is taken as one line period, and a period in which selections signals are input to all of the gate signal lines and one image is displayed is taken as one frame period.

When a display signal is input to the source signal line S1 and a selection signal is input to the gate signal line G1, a positive polarity display signal is input to the pixel (1,1) formed in the portion at which the source signal line S1 and the gate signal line G2 intersect. The electric potential imparted to the pixel electrode in the pixel (1,1) in accordance with the input display signal then ideally continues to be stored throughout the frame period in accordance with means such as a storage capacitor.

However, in practice, when the electric potential of the gate signal line G1 shifts to an electric potential for placing the pixel TFT in an OFF state when the one line period is complete, the electric potential of the pixel electrode is dragged by ΔV in the direction of the shift in the gate signal line G1 electric potential. This phenomenon is referred to as field through, and the voltage DV is referred to as a punch through voltage.

The punch through voltage ΔV is expressed by the following equation.

$$\Delta V = V \times Cgd/(Cgd + Clc + Cs)$$

In the above equation, V is the amplitude of the gate electrode electric potential, Cgd is the capacitance between the gate electrode and the drain region of the pixel TFT, Clc is the capacitance of the liquid crystals between the pixel electrode and the opposing electrode, and Cs is the capacitance of the storage capacitor.

In the timing chart shown in FIG. 28, the actual electric potential of the pixel electrode in the pixel (1,1) is shown by a solid line, and the ideal electric potential of a pixel electrode in which field through is not considered is shown by a dotted line. In a first frame period, a positive polarity display signal is input to the pixel (1,1). The electric potential of the gate signal line changes in the negative direction at the same time as the first line period is completed in the first frame period shown in FIG. 28, and the electric potential of the pixel electrode of the pixel (1,1) also actually changes in the negative direction by the amount of the punch through voltage. Note that, in FIG. 28, the punch through voltage during in the first frame period is denoted by the symbol ΔV1.

Next, in a first line period of a second frame period, a negative polarity display signal, having a polarity which is the inverse of that of the first line period of the first frame period, is input to the pixel (1,1). The electric potential of the gate signal line G1 then changes in the negative direction when the first line period is completed in the second frame period. The electric potential of the pixel electrode of the pixel (1,1) also actually changes, at the same time, in the negative direction by the amount of the punch through voltage. Note that, in FIG. 28, the punch through voltage during in the second frame period is denoted by the symbol ΔV2.

The drive voltage after the first line period of the first frame period is complete is shown by the reference symbol V1, and the drive voltage after the first line period of the second frame period is complete is shown by the reference symbol V2 in FIG. 28. Note that the term drive voltage denotes the electric potential difference between the electric potential of the pixel electrode and the electric potential of the opposing electrode in this specification.

The drive voltage V1 and the drive voltage V2 have a voltage difference of ΔV1+ΔV2. The brightness of the image in the pixel (1,1) therefore differs in the first frame period and the second frame period.

A method in which the value of the opposing electric potential is made lower can also be considered so as to make the values of the drive voltage V1 and the drive voltage V2 become the same.

However, the capacitance Cgd between the gate electrode and the drain region of the pixel TFT has different values when positive polarity and negative polarity display signals are input to the pixel. In addition, the capacitance Clc of the liquid crystal between the pixel electrode and the opposing electrode also changes in accordance with the electric potential of the display signal input to the pixel. The value of the punch through voltage ΔV therefore also changed with each frame period because of differing values of Cgd and Clc in each frame period. Consequently, even if the value of the opposing electric potential is changed, for example, the drive voltage in the pixel (1,1) changed in accordance with the frame period, and the resulting image brightness changes.

This is a phenomenon not limited to the pixel (1,1), and occurs in all of the pixels. The brightness of the pixels therefore differs due to the polarity of the display signals input to the pixels.

The brightness of the image displayed in the first frame period differs from that of the image displayed in the second frame period in frame inversion drive, and this is seen as flicker by an observer. In particular, conspicuous flicker is confirmed in the display of intermediate gray scales.

The brightness of the display also similarly differs in source line inversion drive, gate line inversion drive, and dot inversion drive between pixels to which a positive polarity display signal is input and pixels to which a negative polarity display signal is input.

Consequently, vertical stripes are displayed on the screen with source line inversion drive, and horizontal stripes are displayed with gate line inversion drive. Furthermore, there are times at which vertical stripes, horizontal stripes, or diagonal stripes appear with dot inversion drive, depending upon the image displayed in the screen.

It has been considered that increasing the frame frequency would be effective in order to prevent flicker from being able to be seen on the screen, and in order to prevent vertical stripes, horizontal stripes, and vertical stripes from being visible with alternating current drive.

However, it is necessary to increase the frequency of the image signal input to the IC in order to increase the frame frequency. If the frequency of the image signal is raised, it then becomes necessary to increase the specification of electronic devices for generating the image signal, and the cost is increased. Further, the drive frequency of the electronic devices that generate the image signal becomes unable to handle the image signal frequency, and a load is imparted on the electronic devices that generate the image signals. Operation may become impossible, and there is the possibility that difficulties will develop due to reliability.

SUMMARY OF THE INVENTION

In view of the above problems, an object of the present invention is to provide a method of driving a semiconductor device capable of performing clear display of a high definition image, in which flicker, vertical stripes, horizontal stripes, and diagonal stripes are made difficult to detect by an observer. In addition, an object of the present invention is to provide a semiconductor device using the driving method.

With the present invention, the prescribed frame frequency of an image signal input to a semiconductor display device from the outside is increased in a frame rate conversion portion of the semiconductor display device. Note that, in this specification, the term frame rate conversion portion denotes a circuit which changes the frequency of an input signal and then outputs the changed frequency signal. The electric potential of display signals input to each pixel is then inverted in consecutive frame periods, with the electric potential of an opposing electrode (opposing electric potential) as a reference, and the same image is displayed in a pixel portion in the two consecutive frame periods.

Flicker, vertical stripes, horizontal stripes, and diagonal strips can be made more difficult to notice by an observer, and clear display of a high definition image can be performed in accordance with the above structure.

Further, in accordance with using frame inversion in particular with the present invention, the development of stripes due to a phenomenon referred to as disclination between adjacent pixels can be suppressed, and drops in the brightness of the image displayed over an entire screen can be prevented. Disclination is a phenomenon in which an electric field develops between pixel electrodes to which a positive display signal is input, and pixel electrodes to which a negative display signal is input, and the orientation of liquid crystal molecules becomes disordered. The distance between pixel electrodes of adjacent pixels becomes shorter when the pixels are made more high definition, and therefore the electric field between the pixel electrodes becomes larger, and the aperture ratio is seen to drop remarkably due to the disclination. The use of frame inversion in particular by the present invention is therefore effective in that the brightness of the overall display screen is not reduced.

The frame conversion portion in the semiconductor display device of the present invention has one RAM or a plurality of RAMs. An image signal input from the outside is written into the one RAM, or into one of the plurality of RAMs, and the input image signals are then output two times each, in order. Input of the image signal to the RAM, and output of the image signal from the RAM, can be performed at the same time in accordance with the above structure.

Further, it is very important that a period for outputting the read in image signal one time from the RAM be shorter than a period for inputting the image signal to the RAM with the present invention. In accordance with the above structure, the frequency of the image signal after being output from the RAM can be made higher than the frequency of the image signal before it is input to the RAM.

In addition, it is also very important that the electric potential of one display signal, from among two display signals generated using the image signal output twice from the RAM, be inverted, with the electric potential of the opposing electrode (opposing electric potential) as a reference. Two display signals having inverted polarities are therefore generated. The electric potential of the display signals input to each pixel are inverted, with the electric potential of the opposing electrodes (opposing electric potential) as a reference, in each of two consecutive frame periods, and the same image is therefore displayed in a pixel portion in the two consecutive frame periods.

The frame frequency can therefore be increased without increasing the frequency of the image signal input to an IC, there is no load placed on electronic equipment which generates the image signal, and clear display of a high definition image can be performed with flicker, vertical stripes, horizontal stripes, and diagonal stripes being difficult to see by an observer.

Further, by using frame inversion in particular with the present invention, the generation of stripes due to the phenomenon referred to as disclination between adjacent pixels can be suppressed, and a reduction in the brightness of the overall display screen can be prevented.

The time average of the electric potential of the display signals input to each pixel become very close to the opposing electric potential, and this is very effective in preventing degradation of liquid crystals compared to a case of inputting different display signals into each pixel during each frame period.

The present invention can be used in all alternating current drive methods, such as frame inversion drive, source line inversion drive, gate line inversion drive, and dot inversion drive.

Note that, with the present invention, the plurality of RAMs and the source signal line driver circuit may be formed on the IC substrate, and they may also be formed on the active matrix substrate on which the pixel portion is formed. Furthermore, a portion of the source signal line driver circuit may be formed on the active matrix substrate, and the remainder may be formed on the IC substrate, and the two may be connected by means such as an FPC.

Note that, in the semiconductor display device of the present invention, transistors used in the pixels may be transistors formed using single crystal silicon, and they may be thin film transistors which use polycrystalline or amorphous silicon. Further, transistors using organic semiconductors may also be used.

Structures of the present invention are shown below.

According to the present invention, there is provided a semiconductor device comprising: a plurality of pixel TFTs; a plurality of pixel electrodes; an opposing electrode; and a frame rate conversion portion; characterized in that:

a display signal is input to the plurality of pixel electrodes through the plurality of pixel TFTs;

all of the display signals input to the plurality of pixel electrodes have the same polarity within each frame period, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a semiconductor device comprising: a plurality of pixel TFTs; a plurality of pixel electrodes; an opposing electrode; a plurality of source signal lines; and a frame rate conversion portion; characterized in that:

a display signal input to the plurality of source signal lines is then input to the plurality of pixel electrodes through the plurality of pixel TFTs;

within each frame period: display signals having mutually inverse polarities, with the electric potential of the opposing electrode as a reference, are input to source signal lines which are adjacent to the plurality of source signal lines; and the display signals input to each of the plurality of source signal line always have the same polarity, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a semiconductor device comprising: a plurality of pixel TFTs; a plurality of pixel electrodes; an opposing electrode; a plurality of source signal lines; and a frame rate conversion portion; characterized in that:

a display signal input to the plurality of source signal lines is then input to the plurality of pixel electrodes through the plurality of pixel TFTs;

within each frame period: the display signals input to all of the plurality of source signal lines always have the same polarity, with the electric potential of the opposing electrode as a reference;

the polarities of the display signals input to the plurality of source signal lines are mutually inverted in adjacent line periods, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a semiconductor device comprising: a plurality of pixel TFTs; a plurality of pixel electrodes; an opposing electrode; a plurality of source signal lines; and a frame rate conversion portion; characterized in that:

a display signal input to the plurality of source signal lines is input to the plurality of pixel electrodes through the plurality of pixel TFTs;

within each frame period: display signals having mutually inverse polarities, with the electric potential of the opposing electrode as a reference, are input to source signal lines adjacent to the plurality of source signal lines;

the polarities of the display signals input to the plurality of source signal lines are mutually inverted in adjacent line periods, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a semiconductor display device comprising: a pixel portion having a plurality of pixels; a source signal line driver circuit; and a frame rate conversion portion; characterized in that:

each of the plurality of pixels has: a pixel TFT; a pixel electrode; and an opposing electrode;

the frame rate conversion portion has one RAM, or a plurality of RAMs;

image signals are written into the one RAM, or into one of the plurality of RAMS;

the image signals written into the one RAM, or into one of the plurality of RAMs, are each read out twice;

the image signals which are read out twice from the one RAM or from one of the plurality of RAMs are then input to the source signal line driver circuit;

two display signals are generated by the source signal line driver circuit;

the two display signals have mutually inverted polarities;

the two generated display signals are input to the pixel electrodes through the pixel TFTs; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the pixel TFTs; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both input to the source signal line driver circuit;

two display signals are generated by the source signal line driver circuit;

the two display signals have mutually inverted polarities;

the two generated display signals are input to the pixel electrodes through the pixel TFTs;

within each frame period, all of the display signals input to the pixel electrodes have the same polarity, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the pixel TFTs;

within each frame period, all of the display signals input to the pixel electrodes have the same polarity, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; a plurality of source signal lines; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both input to the source signal line driver circuit;

two display signals are generated by the source signal line driver circuit;

the two display signals have mutually inverted polarities;

the two generated display signals are input to the pixel electrodes through the plurality of source signal lines and through the pixel TFTs;

within each frame period: display signals having mutually inverse polarities, with the electric potential of the opposing electrode as a reference, are input to source signal lines adjacent to the plurality of source signal lines; and the display signals input to the plurality of source signal lines always have the same polarity, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; a plurality of source signal lines; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both converted into analog signals in a D/A converter circuit and then input to the source signal line driver circuit;

two display signals are generated by the source signal line driver circuit;

the two display signals have mutually inverted polarities;

the two generated display signals are input to the pixel electrodes through the plurality of source signal lines and through the pixel TFTs;

within each frame period: display signals having mutually inverse polarities, with the electric potential of the opposing electrode as a reference, are input to source signal lines adjacent to the plurality of source signal lines; and the display signals input to the plurality of source signal lines always have the same polarity, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; a plurality of source signal lines; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both input to the source signal line driver circuit;

two display signals are generated by the source signal line driver circuit;

the two display signals have mutually inverted polarities;

the two generated display signals are input to the pixel electrodes through the plurality of source signal lines and through the pixel TFTs;

within each line period, the display signals input to all of the plurality of source signal lines always have the same polarity, with the electric potential of the opposing electrode as a reference;

the polarities of the display signals input to the plurality of source signal lines are mutually inverted in adjacent line periods, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the pixel TFTs;

within each line period, the display signals input to all of the plurality of source signal lines always have the same polarity, with the electric potential of the opposing electrode as a reference;

the polarities of the display signals input to the plurality of source signal lines are mutually inverted in adjacent line periods, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; a plurality of source signal lines; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both input to the source signal line driver circuit;

two display signals are generated by the source signal line driver circuit;

the two display signals have mutually inverted polarities;

the two generated display signals are input to the pixel electrodes through the pixel TFTs;

display signals having mutually inverse polarities, with the electric potential of the opposing electrode as a reference, are input to source signal lines adjacent to the plurality of source signal lines within each frame period;

the polarities of the display signals input to the plurality of source signal lines are mutually inverted in adjacent line periods, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a semiconductor display device comprising: a pixel portion having a plurality of pixels; a source signal line driver circuit; a plurality of source signal lines; and a frame rate conversion portion; characterized in that:

the plurality of pixels each has: a pixel TFT; a pixel electrode; and an opposing electrode;

the frame rate conversion portion has one RAM, or a plurality of RAMs;

image signals are written into the one RAM, or into one of the plurality of RAMs;

the image signals written into the one RAM, or into one of the plurality of RAMs, are each read out twice;

the image signals which are read out twice from the one RAM or from one of the plurality of RAMs are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the pixel TFTs;

display signals having mutually inverse polarities, with the electric potential of the opposing electrode as a reference, are input to source signal lines adjacent to the plurality of source signal lines within each frame period;

the polarities of the display signals input to the plurality of source signal lines are mutually inverted in adjacent line periods, with the electric potential of the opposing electrode as a reference; and a period in which one image signal is written into the one RAM or is written into one of the plurality of RAMs is longer than a period during which the written in image signal is read out a first time, and longer than a period during which the written in image signal is read out a second time.

According to the present invention, there is provided a method of driving a semiconductor display device having a plurality of pixel TFTs, a plurality of pixel electrodes, an opposing electrode, and a frame rate conversion portion, characterized in that:

display signals are input to the plurality of pixel electrodes through the plurality of pixel TFTs;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a method of driving a semiconductor display device having a plurality of pixel TFTs, a plurality of pixel electrodes, an opposing electrode, and a frame rate conversion portion, characterized in that:

display signals are input to the plurality of pixel electrodes through the plurality of pixel TFTs;

all display signals input to the plurality of pixel electrodes have the same polarity within each frame period, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a method of driving a semiconductor display device having a plurality of pixel TFTs, a plurality of pixel electrodes, an opposing electrode, a plurality of source signal lines, and a frame rate conversion portion, characterized in that:

display signals input to the plurality of source signal lines are then input to the plurality of pixel electrodes through the plurality of pixel TFTs;

within each frame period: display signals having mutually inverse polarities, with the electric potential of the opposing electrode as a reference, are input to source signal lines adjacent to the plurality of source signal lines; and the display signals input to the plurality of source signal lines always have the same polarity, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a method of driving a semiconductor display device having a plurality of pixel TFTs, a plurality of pixel electrodes, an opposing electrode, a plurality of source signal lines, and a frame rate conversion portion, characterized in that:

display signals input to the plurality of source signal lines are then input to the plurality of pixel electrodes through the plurality of pixel TFTs;

within each line period, the display signals input to all of the plurality of source Signal lines always have the same polarity, with the electric potential of the opposing electrode as a reference;

the polarities of the display signals input to the plurality of source signal lines are mutually inverted in adjacent line periods, with the electric potential of the opposing electrode as a reference;

the frame rate conversion portion operates in synchronous with the display signals; and among two arbitrary, adjacent frame periods, the display signal input to the plurality of pixel electrodes in the latter frame period to appear has an electric potential which is an inversion of the display signal input to the plurality of pixel electrodes in the former frame period, with the electric potential of the opposing electrode as a reference.

According to the present invention, there is provided a method of driving a semiconductor display device having a plurality of pixel TFTs, a plurality of pixel electrodes, an opposing electrode, a plurality of source signal lines, and a frame rate conversion portion, characterized in that:

display signals input to the plurality of source signal lines are then input to the plurality of pixel electrodes through the plurality of pixel TFTs;

display signals having mutually inverse polarities, with the electric potential of the opposing electrode as a reference, are input to source signal lines adjacent to the plurality of source signal lines within each frame period;

the polarities of the display signals input to the plurality of source signal lines are mutually inverted in adjacent line periods, with the electric potential of the opposing electrode as a reference;

the frame rate conversion portion operates in synchronous with the display signals; and among two arbitrary, adjacent frame periods, the display signal input to the plurality of pixels in the latter frame period to appear has an electric potential which is an inversion of the display signal input to the plurality of pixels in the former frame period, with the electric potential of the opposing electrode as a reference The RAM may be an SDRAM with the present invention.

The present invention includes computers, video cameras, and DVD players using the semiconductor display device.

DETAILED DESCRIPTION OF THE PREFERRED EMBODIMENTS

Embodiment Mode

Figure 1:
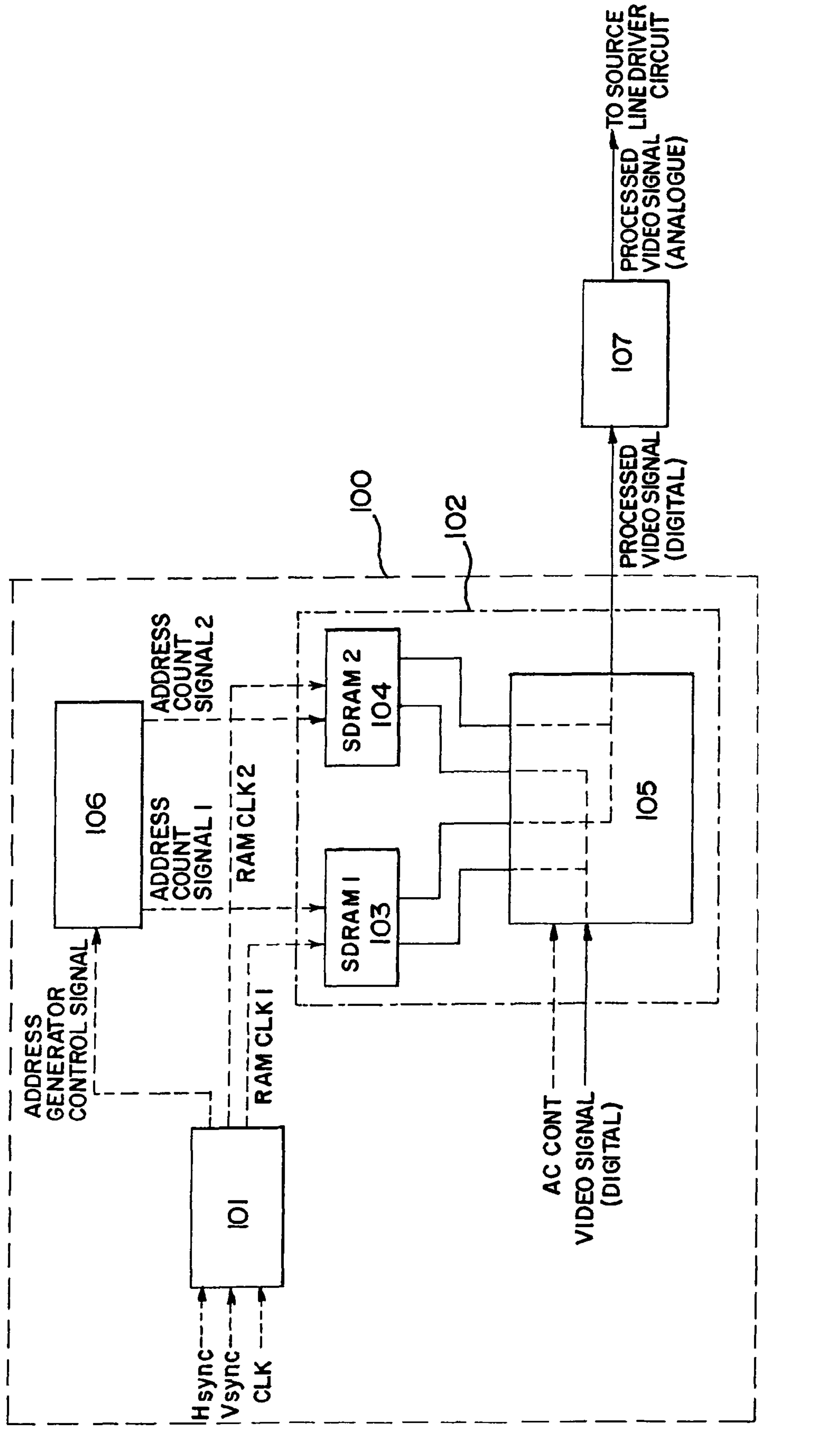
FIG. 1 is a block diagram of a frame rate conversion portion of a semiconductor display device of the present invention.

A frame rate conversion portion of a semiconductor display device of the present invention is explained below using FIG. 1. Note that a structure using an SDRAM (synchronous dynamic random access memory) is shown as a RAM in the embodiment mode. However, the present invention is not limited to this RAM structure, and provided that it is possible to input and output date at high speed, it is also possible to use a DRAM (dynamic random access memory) and an SRAM (static random access memory).

A frame rate conversion portion 100 has a control portion 101, a frame frequency conversion portion 102, and an address generator portion 106. Further, the frame frequency conversion portion 102 has a first SDRAM (SDRAM 1) 103, a second SDRAM (SDRAM 2) 104, and a date format portion 105. Reference numeral 107 denotes a D/A converter circuit, which converts an image signal output from the frame rate conversion portion 100 from digital to analog.

Note that although the frame frequency conversion portion 102 has two SDRAMs (the first SDRAM 103 and the second SDRAM 104) in the embodiment mode, the number of SDRAMs is not limited to two, and any number may be used. A case in which there are two SDRAMs is used in order to simplify the explanation in the embodiment mode.

An Hsync signal, a Vsync signal, and a CLK signal are input to the control portion 101. An address generator control signal for controlling drive of the address generator portion, and SDRAM control signals RAM CLK1 and RAM CLK2 for controlling drive of the first SDRAM 103 and the second SDRAM 104, are output from the control portion 101 in accordance with the Hsync signal, the Vsync signal, and the CLK signal.

The address generator portion 106 is driven in accordance with the address generator control signal input from the control portion 101, and determines counter values for specifying the memory address locations of the first SDRAM 103 and the second SDRAM 104. For example, if the counter value is 0, then the memory address location 0 of the first SDRAM 103 and the second SDRAM 104 is specified. If the counter value is 1, then the memory address location 1 is specified, if the counter value is 2, the memory address location 2 is specified; the memory address location q is specified if the counter value is q.

Counter value information is input to the first SDRAM 103 and to the second SDRAM 104 from the address generator portion 106 as a first counter signal (address count signal 1) and as a second counter signal (address count signal 2), respectively. Note that the counter value of the first counter signal is referred to as a first counter value, and that the counter value of the second counter signal is referred to as a second counter value.

A digital image signal (video signal) is input from the outside to the data format portion 105. Further, the data format portion 105 is connected to an alternating current electric power source (AC cont).

The digital image signal input to the data format portion 105 is written into specified locations of the first and the second SDRAMs 103 and 104, in order, in accordance with the first counter signal and the second counter signal. The digital image signal is not input to a plurality of SDRAMs at the same time, but is always written to only one SDRAM.

The number of bits of the digital video signal input to the data format portion 105 may also be increased, and then written to the first SDRAM 103 and the second SDRAM 104.

The input image signal is next read out from locations of the first and the second SDRAMs 103 and 104, in order, in accordance with the first counter signal and the second counter signal. The digital image signal is not output from a plurality of SDRAMs at the same time, but is always output from only one SDRAM.

Note that output of the image signal is performed twice. Input of the image signal to one SDRAM is then performed in parallel with output of the image signal from another SDRAM.

Figure 2A:
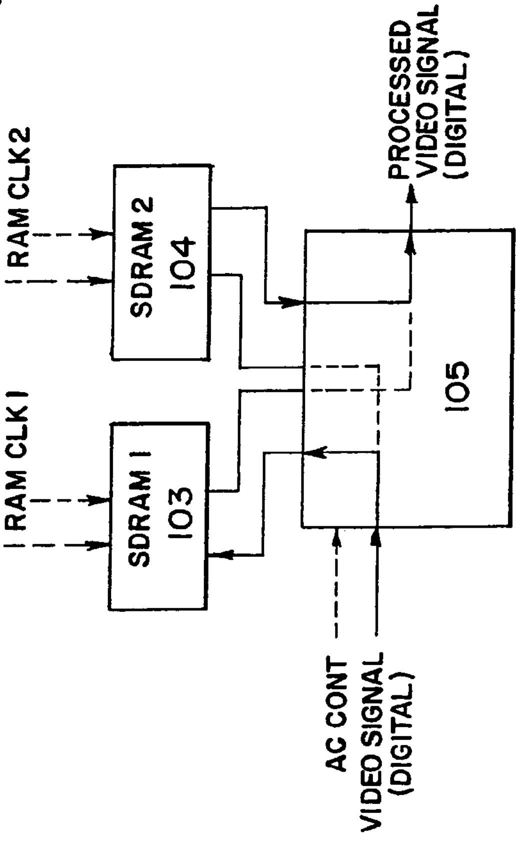
FIGS. 2A and 2B are block diagrams of a frame frequency conversion portion.
Figure 2B:
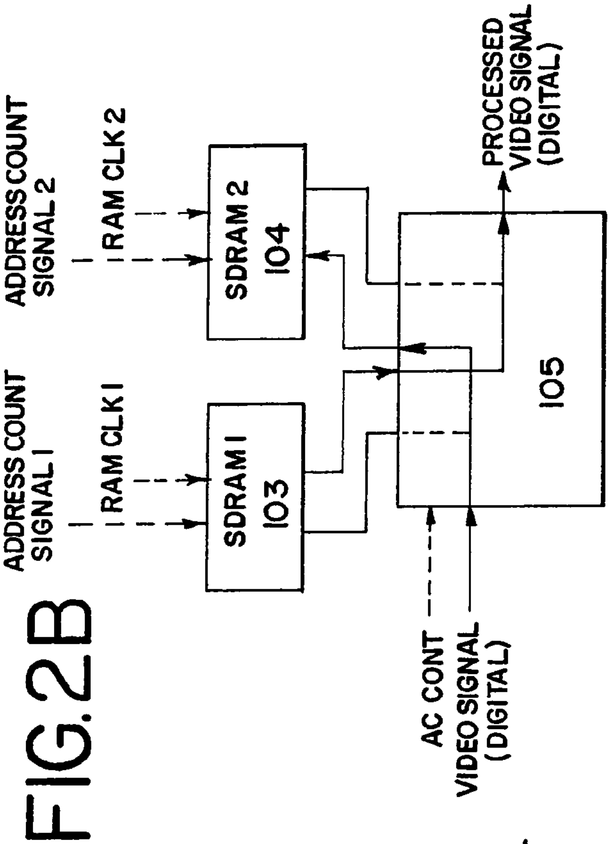

Operation of the frame frequency conversion portion 102 of FIG. 1 is explained in detail using FIGS. 2A and 2B. An image signal is written to the first SDRAM 103 in FIG. 2A, and an image signal written to the second SDRAM 104 is simultaneously output twice. In FIG. 2B, an image signal written to the first SDRAM 103 is output twice at the same time as an image signal is input to the second SDRAM 104.

Note that, although an example of using an SDRAM to which an image signal corresponding to only one image portion can be input is shown in the embodiment mode, the present invention is not limited to this example. A structure utilizing a RAM capable of handling an input image signal corresponding to more than one image portion may also be used. Only one RAM may be used in the present invention, provided that it is capable of handling an input image signal corresponding to at least two image portions. Conversely, an image signal corresponding to one image portion may be input by using a plurality of RAMs if an image signal corresponding to one image portion cannot be input to the RAM.

Figure 3:
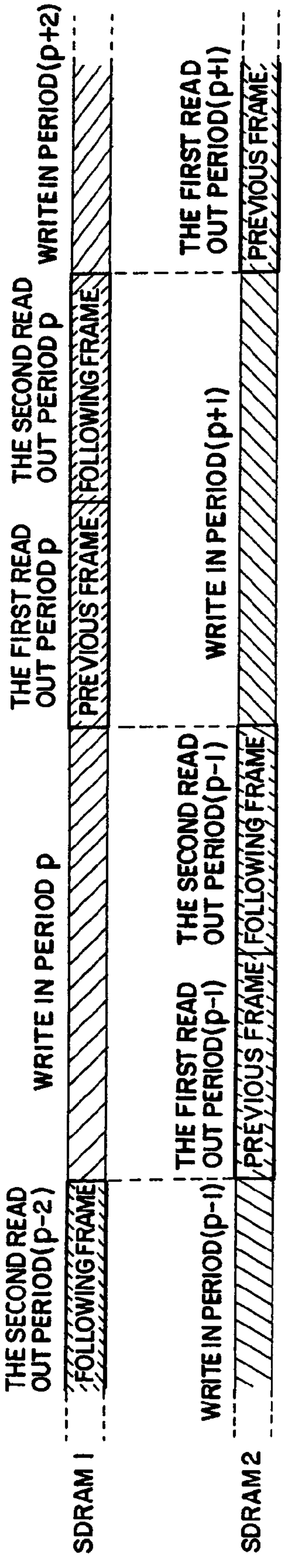
FIG. 3 is a diagram showing timing for input and output of an image signal to and from an SDRAM.

Image signal input and output timing in the first SDRAM 103 and the second SDRAM 104 is shown in FIG. 3. An image signal is written to the first SDRAM 103 in a write in period p. The image signal input to the first SDRAM 103 during the write in period p is then written out two times, during a first read out period p appearing next and during a second read out period p.

Further, an image signal is written to the second SDRAM 104 in a write in period (p−1). The image signal input to the second SDRAM 104 during the write in period (p−1) is then written out two times, during a first read out period (p−1) appearing next and during a second read out period (p−1).

The write in period p and the first and the second read out periods (p−1) appear simultaneously. Namely, read out of the image signal two times from the second SDRAM 104 occurs in parallel with write in of the image signal to the first SDRAM 103.

Further, the write in period (p+1) and the first and the second read out periods p appear simultaneously. Namely, read out of the image signal two times from the first SDRAM 103 occurs in parallel with write in of the image signal to the second SDRAM 104.

A write in period (p+2) appears when the first and the second read out periods p are complete, and the image signal is again written to the first SDRAM 103. In parallel with this, a first and a second read out period (p+1) appear, and the image signal is read out two times from the second SDRAM 104.

The read out image signal is then input to the data format portion 105. One of the image signals, from among the image signals read out two times, then undergoes data processing in the data format portion 105 so that its polarity is inverted, with the electric potential of an opposing electrode of liquid crystals as a reference, when converted into analog. The two image signals, the data processed image signal and the image signal which has not undergone data processing, are then output from the data format portion 105 as processed image signals (processed video signals).

The two image signals output from the data format portion 105 are then input to the D/A converter circuit 107 and converted to analog. Note that two electric power source voltages, high and low, are constantly imparted to the D/A converter circuit 107, and that two analog image signals having inverse polarities, with the electric potential of the opposing electrode as a reference, are output from the D/A converter circuit 107. The two image signals converted to analog are then input to a source signal line driver circuit in order.

Note that the image signals may be converted serial to parallel in the data format portion 105, divided into a number of divisions corresponding to divided drive, and then input to the D/A converter circuit 107.

Division drive is a method of driving in order to suppress the drive frequency of the source signal line driver circuit without making the image display speed slower. Specifically, it is a method of driving in which source signal lines are divided into m groups, and display signals are input simultaneously to the m source signal lines within one line period.

Figures 4A, 4B:
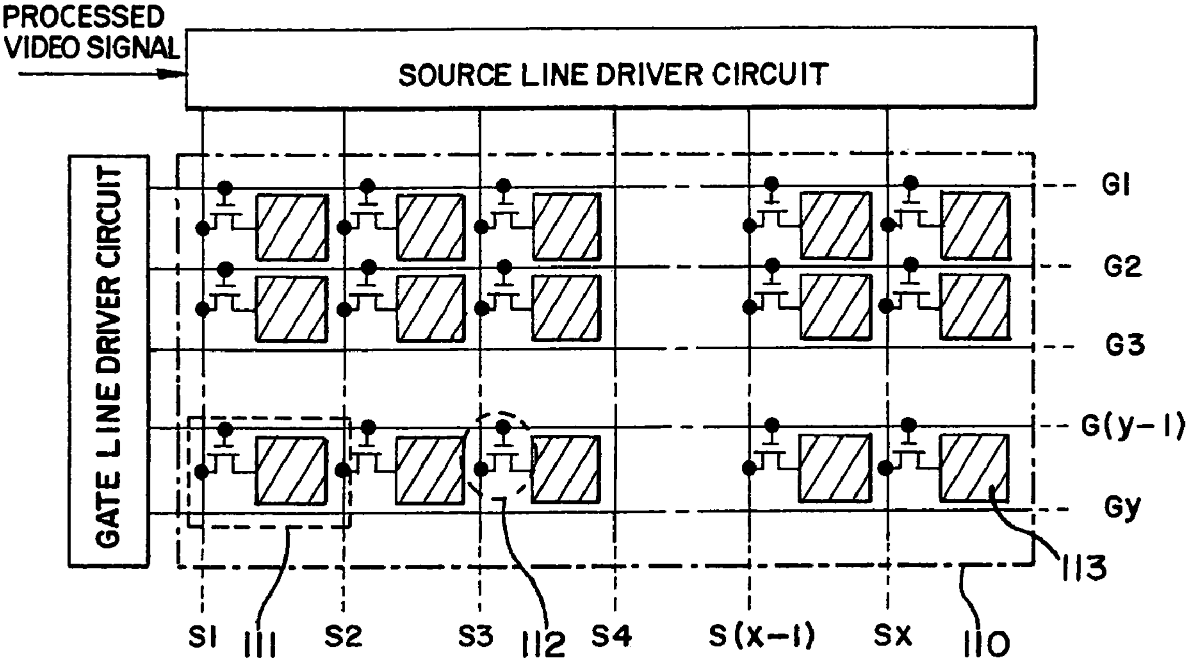
FIGS. 4A and 4B are a diagram of a pixel portion and a driver circuit, and a pixel pattern diagram, respectively, of a semiconductor display device of the present invention.

A structure of a pixel portion of an active matrix liquid crystal display device using the driving method of the present invention is shown in FIGS. 4A and 4B. FIG. 4A is a circuit diagram of a pixel portion, and FIG. 4B is a diagram showing a pixel arrangement.

Reference numeral 110 denotes a pixel portion. Source signal lines S1 to Sx connected to a source signal line driver circuit, and gate signal lines G1 to Gy connected to a gate signal line driver circuit are formed in the pixel portion 110. Pixels 111 are formed in the pixel portion 110 in portions surrounded by the source signal lines S1 to Sx and by the gate signal line G1 to Gy. Pixel TFTs 112 and pixel electrodes 113 are formed in the pixels 111.

A selection signal is input to the gate signal lines G1 to Gy from the gate signal line driver circuit, and switching of the pixel TFTs 112 is controlled in accordance with the selection signal. Note that the term control of TFT switching denotes selection of an ON state or an OFF state for the TFT in this specification.

The gate signal line G1 is selected in accordance with the selection signal input to the gate signal line G1 from the gate signal line driver circuit, and the pixel TFTs 112 of pixels (1,1), (1,2), . . . , (1,x) in portions at which the gate signal line G1 and the source signal line S1 intersect are placed in an ON state.

The two analog image signals having inverse polarities and input to the source signal line driver circuit are then sampled in order in accordance with a sampling signal from a shift register or the like within the source signal line driver circuit. The sampled image signals are each input to the source signal lines S1 to Sx as display signals.

The display signals input to the source signal lines S1 to Sx are then input to the pixel electrodes 113 of the pixels (1,1), (1,2), . . . , (1,x) through the pixel TFTs 112. Liquid crystals are driven by the electric potential of the input display signals, the amount of transmitted light is controlled, and portions of an image (images corresponding to the pixels (1,1), (1,2) . . . , (1,x)) are displayed in the pixels (1,1), (1,2), . . . , (1,x).

The gate signal line G1 becomes deselected when the display signals are input to all of the pixels connected to the gate signal line G1. With the state in which the images are displayed in the pixels (1,1), (1,2), . . . , (1,x) maintained by means such as storage capacitors (not shown in the figures), the gate signal line G2 is selected in accordance with a selection signal input to the gate signal line G2. Note that the term storage capacitor denotes a capacitance for storing the electric potential of the display signal input to the gate electrode of the pixel TFT 112 for a fixed period. Portions of the image are similarly displayed one after another in all pixels (2,1), (2,2), . . . , (2,x) connected to the gate signal line G2. The gate signal line G2 continues to be selected during this period.

One image is displayed in the pixel portion 110 by repeating the above operations for all of the gate signal lines in order. The period during which the one image is displayed is referred to as one frame period. The period during which the one image is displayed may also be combined with a vertical return period and taken as one frame period. The state in which the image is displayed in all of the pixels is maintained by means such as storage capacitors (not shown in the figures) until the pixel TFTs of each pixel are again placed in an ON state.

Figure 5:
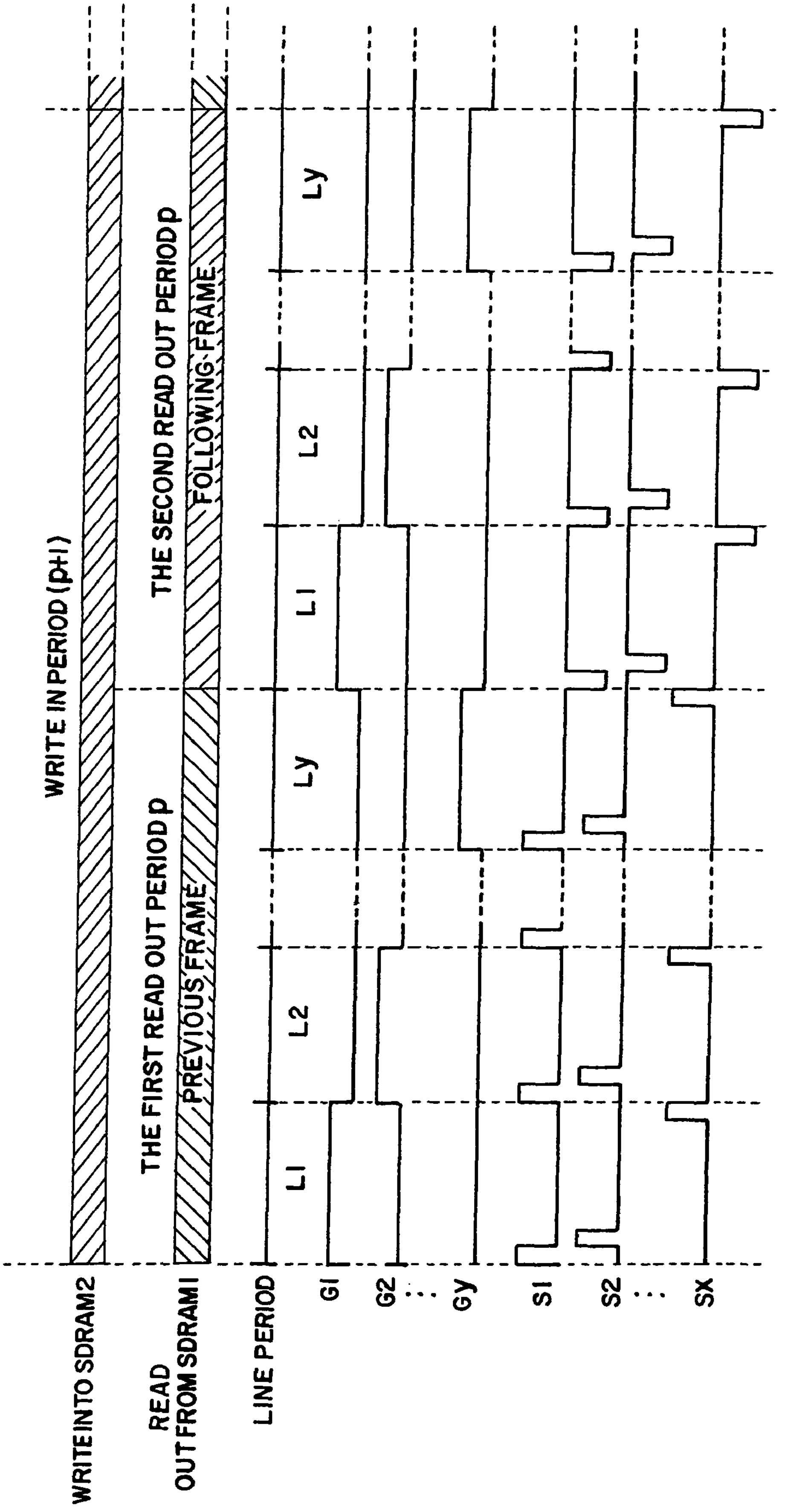
FIG. 5 is a timing chart of a selection signal and a display signal in a pixel portion.

Note that the two image signals have inverse polarities, and that the display signals which are sampled and then input to each source signal line also have inverted polarities. A timing chart for the selection signals and the display signals input to the gate signal lines and to the source signal lines, respectively, in the active matrix liquid crystal display device of FIGS. 4A and 4B is shown in FIG. 5.

The term line period denotes a period during which one gate signal line is selected, and a period until all line periods L1 to Ly appear corresponds to one frame period. Alternatively, all of the line periods L1 to Ly may also be combined with a vertical return period and taken as one frame period. The active matrix liquid crystal display device of the present invention has a first half frame period (previous frame) and a second half frame period (following frame) for displaying the same image.

An image is displayed in the first half frame period based upon the image signal read out from the SDRAM in the first read out period. Then, in the second half frame period, an image is displayed based upon the image signal read out from the SDRAM in the second read out period. The images displayed in the first half frame period and the second half frame periods are therefore the same, but the polarity of the display signals input to each source signal line is inverted.

Figure 6:
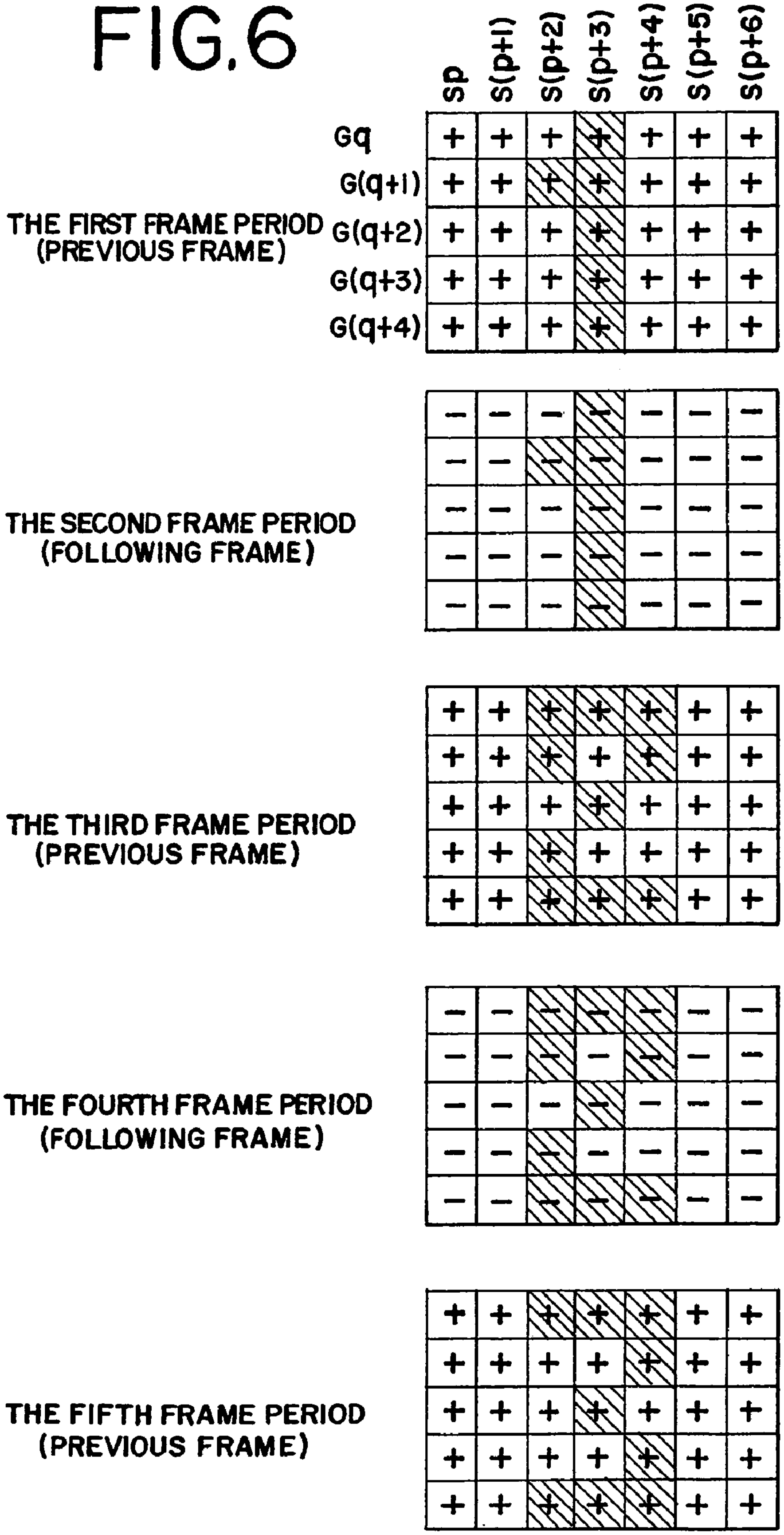
FIG. 6 is a pattern diagram showing the polarity of a display signal input to a pixel portion during frame inversion drive.

The polarities of the display signals input to the pixel electrodes of each pixel when frame inversion drive is performed are shown in FIG. 6. First, third, and fifth frame periods in FIG. 6 correspond to first half frame periods, and second and fourth frame periods correspond to second half frame periods.

The polarities of the display signals input to the pixel electrodes of all pixels are the same in all of the frame periods. The polarities of the display signals input to each pixel are then inverted in the first half frame period and the second half frame period.

The images displayed in the first frame period and in the second frame period are the same. Further, the images displayed in the third frame period and in the fourth frame period are the same. Note that, although a sixth frame period is not shown in the figure, the images displayed in the fifth frame period and in the sixth frame period are the same.

Figure 7:
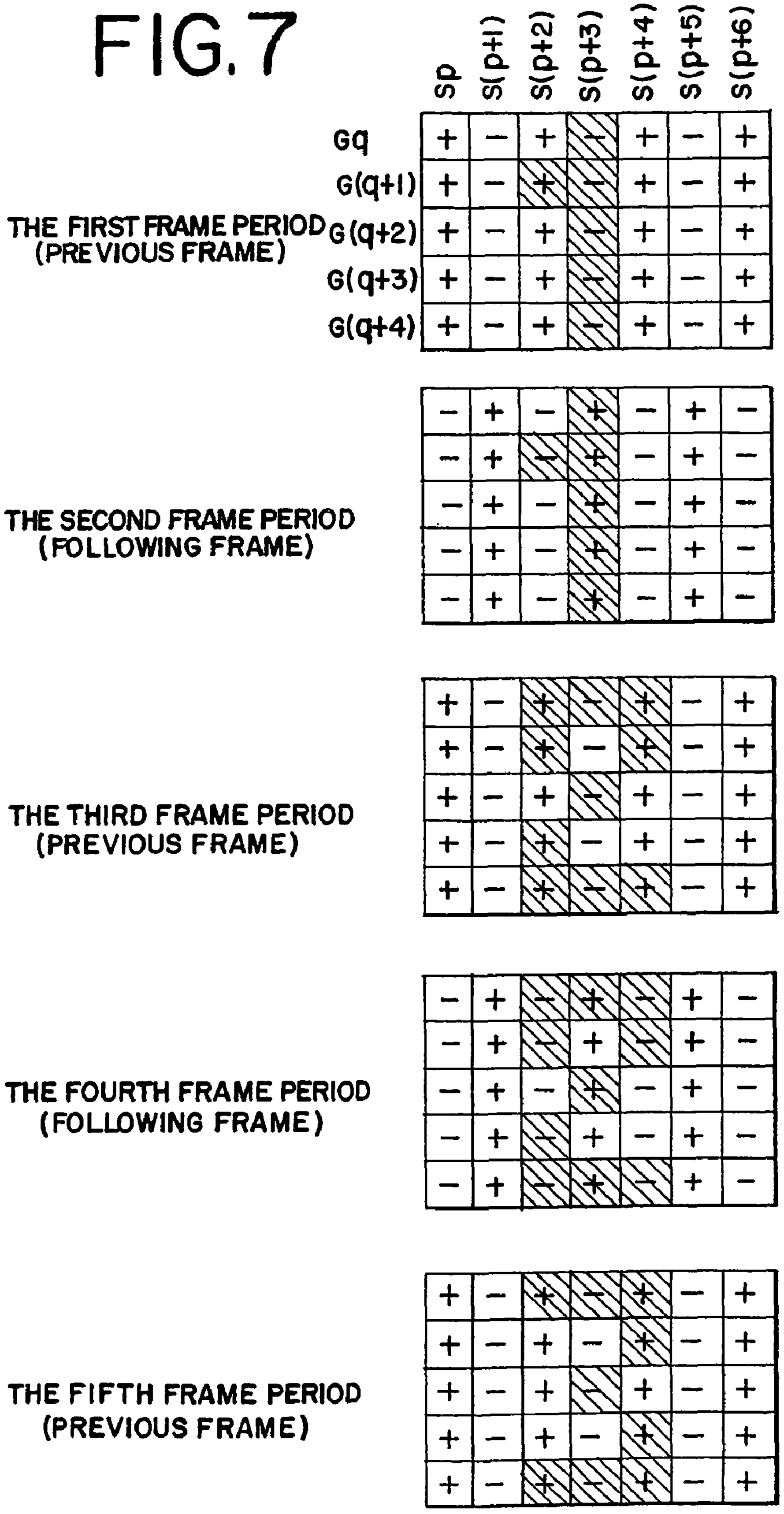
FIG. 7 is a pattern diagram showing the polarity of a display signal input to a pixel portion during source line inversion drive.

The polarities of the display signals input to the pixel electrodes of each pixel when source line inversion drive is performed are shown next in FIG. 7. First, third, and fifth frame periods in FIG. 7 correspond to first half frame periods, and second and fourth frame periods correspond to second half frame periods.

The polarities of the display signals input to the pixel electrodes of all pixels are the same in all of the frame periods. Further, the polarities of the display signals input to the pixel electrodes of pixels connected to adjacent source signal lines are inverted. The polarities of the display signals input to each pixel are then inverted in the first half frame period and the second half frame period.

The images displayed in the first frame period and in the second frame period are the same. Further, the images displayed in the third frame period and in the fourth frame period are the same. Note that, although a sixth frame period is not shown in the figure, the images displayed in the fifth frame period and in the sixth frame period are the same.

Figure 8:
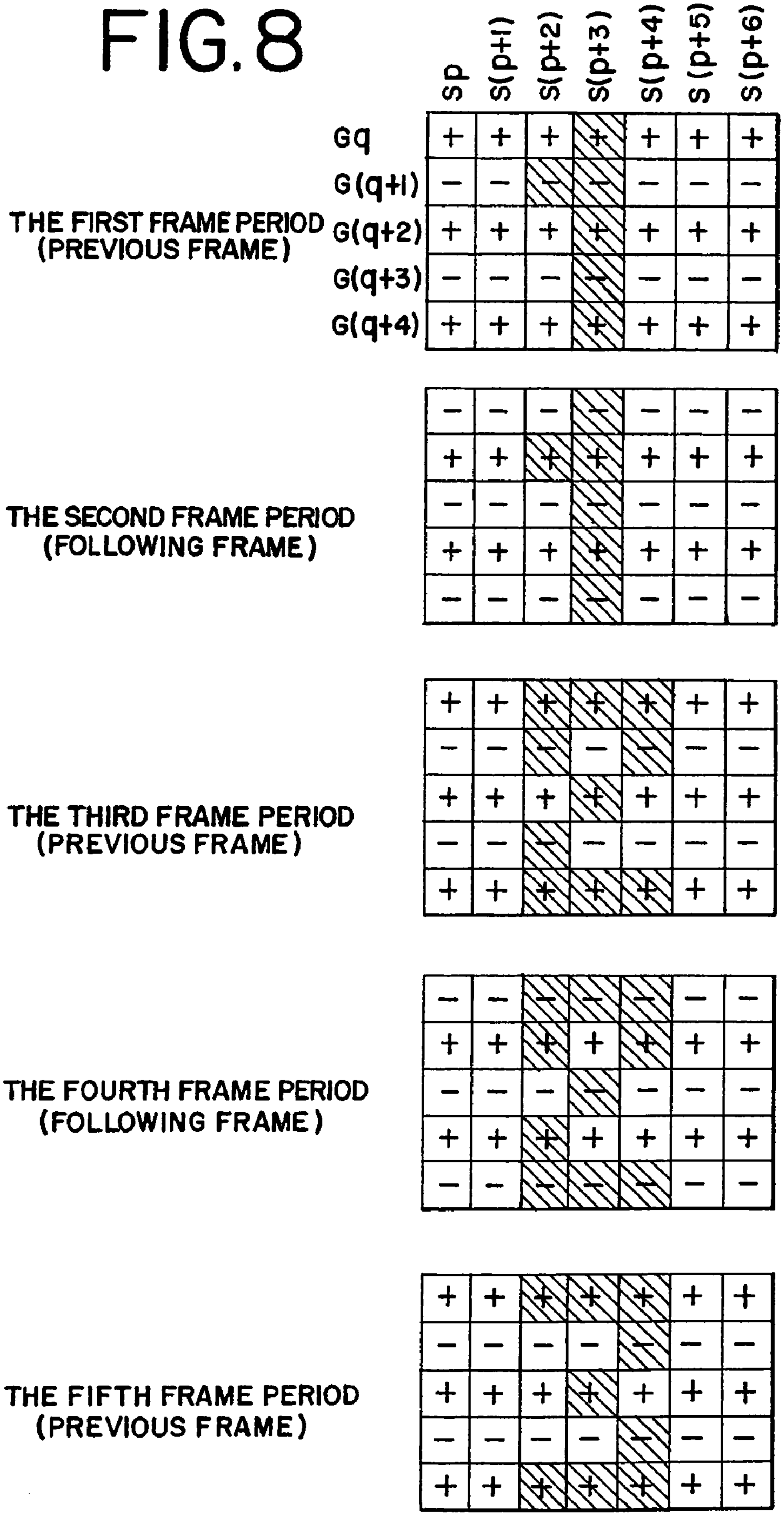
FIG. 8 is a pattern diagram showing the polarity of a display signal input to a pixel portion during gate line inversion drive.

Next, the polarities of the display signals input to the pixel electrodes of each pixel when gate line inversion drive is performed are shown in FIG. 8. First, third, and fifth frame periods in FIG. 8 correspond to first half frame periods, and second and fourth frame periods correspond to second half frame periods.

The polarities of the display signals input to the pixel electrodes of all pixels are the same in all of the frame periods. Further, the polarities of the display signals input to the pixel electrodes of pixels connected to adjacent gate signal lines are inverted. The polarities of the display signals input to each pixel are then inverted in the first half frame period and the second half frame period.

The images displayed in the first frame period and in the second frame period are the same. Further, the images displayed in the third frame period and in the fourth frame period are the same. Note that, although a sixth frame period is not shown in the figure, the images displayed in the fifth frame period and in the sixth frame period are the same.

Figure 9:
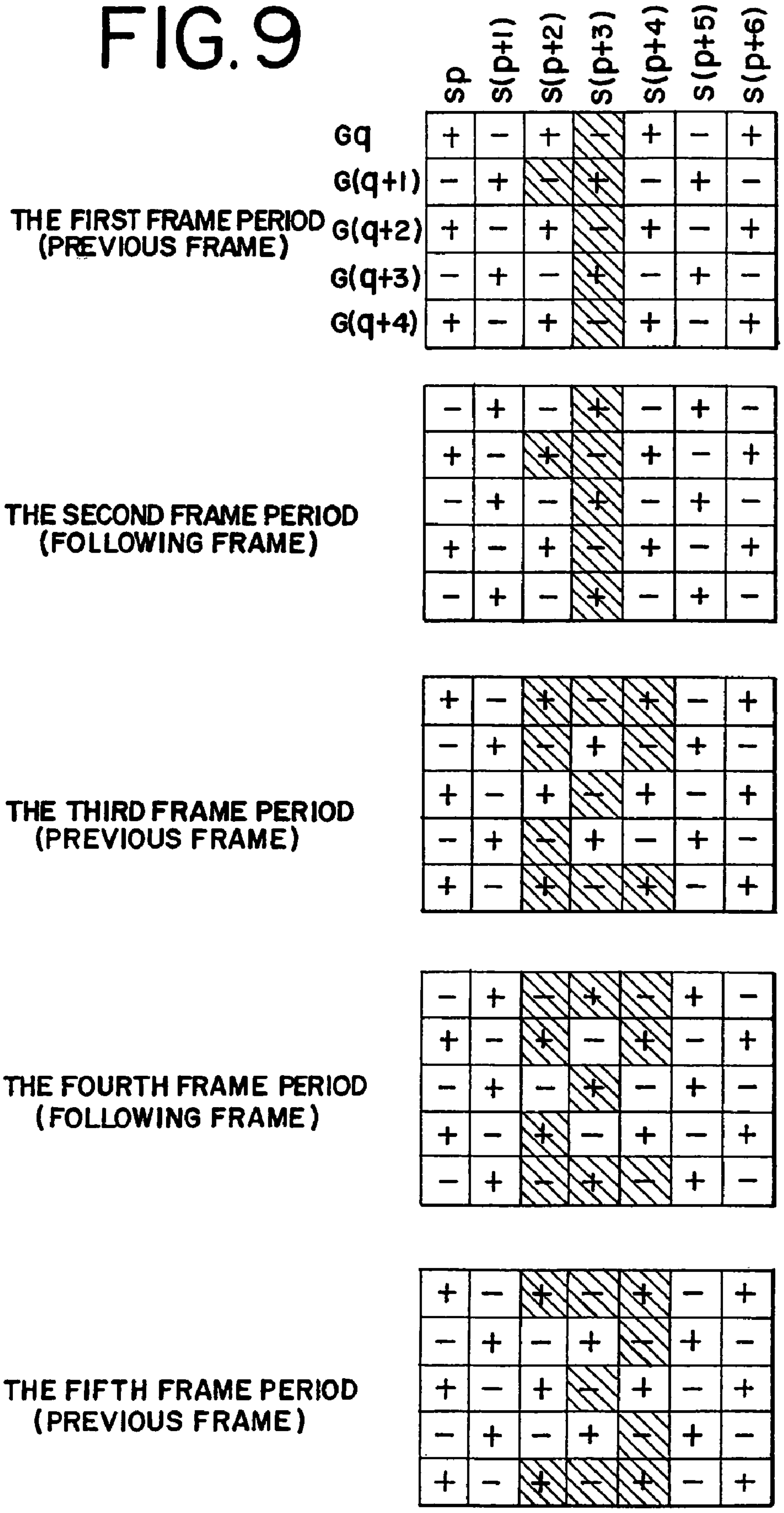
FIG. 9 is a pattern diagram showing the polarity of a display signal input to a pixel portion during dot inversion drive.

The polarities of the display signals input to the pixel electrodes of each pixel when dot inversion drive is performed are shown next in FIG. 9. First, third, and fifth frame periods in FIG. 9 correspond to first half frame periods, and second and fourth frame periods correspond to second half frame periods.

The polarities of the display signals input to the pixel electrodes of adjacent pixels are inverted in all of the frame periods. The polarities of the display signals input to each pixel are then inverted in the first half frame period and the second half frame period.

The images displayed in the first frame period and in the second frame period are the same. Further, the images displayed in the third frame period and in the fourth frame period are the same. Note that, although a sixth frame period is not shown in the figure, the images displayed in the fifth frame period and in the sixth frame period are the same.

In accordance with the above structure, the frequency of the image signal after being read out from the SDRAM can be made higher than the frequency of the image signal before it is written in to the SDRAM with the present invention. The frame frequency in the inside of the active matrix liquid crystal display device can therefore be made higher without raising the frequency of the image signal input from the outside. Consequently, clear display of a high definition image can be performed without placing a load on an electronic device for generating the image signal, and while making it difficult for an observer to see flicker, vertical stripes, horizontal stripes, or diagonal stripes.

In addition, it is very important that the electric potential of one image signal, among the image signals output two times from the SDRAM, be inverted with the electric potential of the opposing electrode (opposing electric potential) as a reference, and then input to the source signal line driver circuit. The electric potentials of the display signals input to each of the pixels are therefore inverted in two consecutive frame periods, with the electric potential of the opposing electrode (opposing electric potential) as a reference, and the same image is displayed in the pixel portion. The time averaged electric potential of the display signal input to the pixels therefore becomes closer to the opposing electric potential. Compared to a case of inputting different display signals in each frame period, this is an effective method for preventing degradation of the liquid crystals, and flicker, vertical stripes, horizontal stripes, or diagonal stripes are unlikely to be seen by an observer.

Further, the generation of stripes due to a phenomenon referred to as disclination in adjacent pixels is suppressed in accordance with using frame inversion in particular with the present invention, and a reduction in the overall display screen brightness can be prevented.

Note that, although an example of using non-interlaced scanning is explained for the above driving method, the present invention is not limited to this method of scanning. Interlaced scanning may also be used for the scanning method.

Further, by imparting two electric power source voltages, high and low, to the D/A converter circuit in the embodiment mode, two analog image signals having inverse polarities are output from the D/A converter circuit, and one of the signals is selected by means such as an analog switch. However, the method of inverting the polarity of the image signal is not limited to such, and known methods can also be used. For example, mutually inverse polarities can also be included as information in two digital image signals before they are input to the D/A converter circuit. Further, the polarity of two analog image signals output in succession from the D/A converter circuit may also be mutually inverted by controlling the height of the electric power source voltage imparted to the D/A converter circuit.

EMBODIMENTS

Embodiments of the present invention are explained below.

Embodiment 1

Input and output timing of an image signal in the first SDRAM 103 and the second SDRAM 104 of FIG. 1 are explained in Embodiment 1 using an example which differs from that of FIG. 3.

The first and the second read out periods are shorter than the write in period in Embodiment 1. A blank period during which write in and read out of the image signal is not performed is then provided after completion of a first and a second read out periods and before the start of a next write in period.

Figure 10:
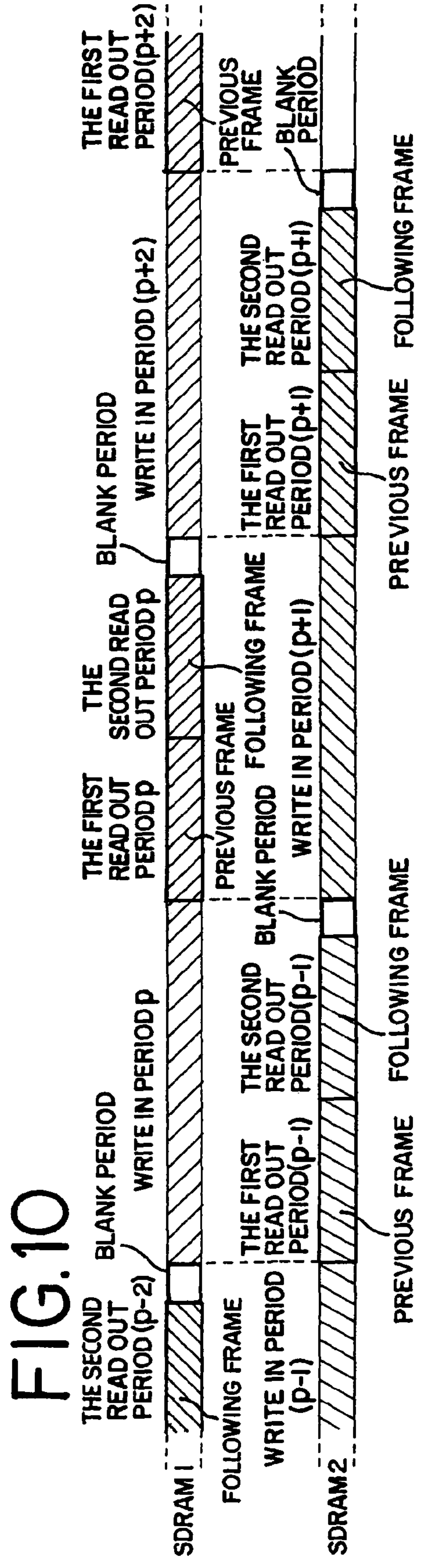
FIG. 10 is a diagram showing timing for input and output of an image signal to and from an SDRAM.

Image signal write in and read out timing for the first SDRAM 103 and the second SDRAM 104 is shown in FIG. 10. The image signal is written to the first SDRAM 103 in the write in period p. The image signal-input to the first SDRAM 103 in a write in period p is then read out two times, in a first read out period p and in a second read out period p.

Further, the image signal is written to the second SDRAM 104 in a write in period (p−1). The image signal input to the second SDRAM 104 in the write in period (p−1) is then read out two times, in a first read out period (p−1) and in a second read out period (p−1).

The write in period p, and the first and the second readout periods (p−1) appear at the same time. Namely, the image signal is read out two times from the second SDRAM 104 while the image signal is input to the first SDRAM 103.

Further, a write in period (p+1), and the first and the second read out periods p appear at the same time. Namely, the image signal is read out two times from the first SDRAM 103 while the image signal is input to the second SDRAM 104.

A blank period then appears when the first and the second read out periods p are completed. The blank period is a period during which write in and read out of image signals is not performed. A write in period (p+2) appears when the blank period is completed, and the image signal is again written to the first SDRAM 103, and at the same time, first and second read out periods (p+1) appear, and the image signal is thereafter read out two times from the second SDRAM 104.

It is necessary that the length of the blank period be longer than the length calculated by subtracting the sum of the first and the second-read out periods from the write in period. Any number of blank periods may be formed, provided that there is no image flicker. By forming the blank period, the image signal is not written to two or more SDRAMs, and the image signal is not read out from two or more SDRAMs.

Note that the blank period may also be formed between the write in period and the first read out period, and may also be formed between the second read out period and the write in period. Further, the blank period may also be formed between the first read out period and the second read out period.

The image signal read out twice is then input to the data format portion 105.

Embodiment 2

Input and output timing of an image signal in the first SDRAM 103 and the second SDRAM 104 of FIG. 1 are explained in Embodiment 2 using an example which differs from that of FIG. 3 and FIG. 10.

The first and the second read out periods are longer than the write in period in Embodiment 2. A blank period during which write in and read out of the image signal is not performed is then formed after completion of the write in period and before the start of a next is first read out period.

Figure 11:
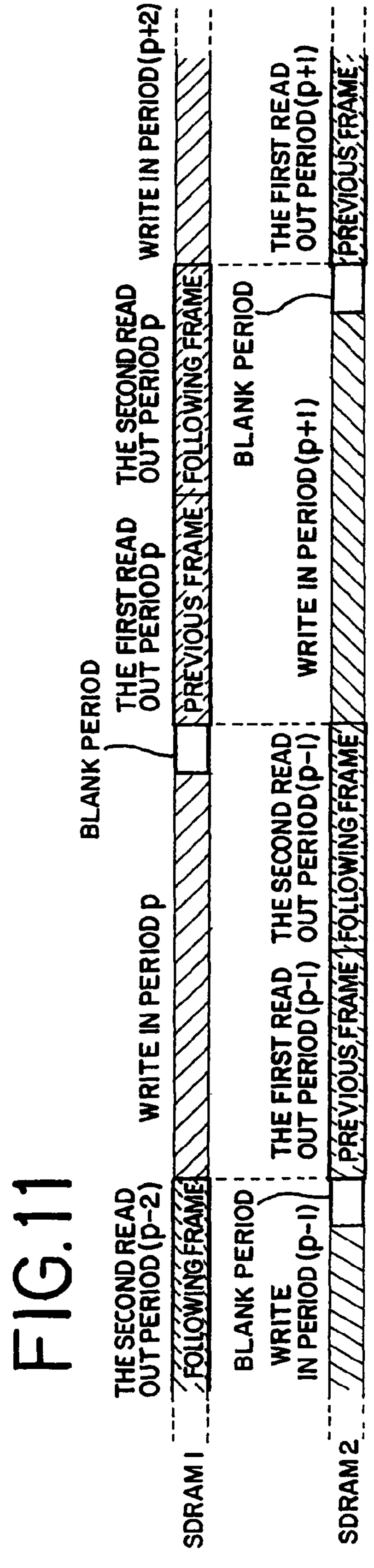
FIG. 11 is a diagram showing timing for input and output of an image signal to and from an SDRAM.

Image signal write in and read out timing for the first SDRAM 103 and the second SDRAM 104 is shown in FIG. 11. The image signal is written to the first SDRAM 103 in a write in period p. A blank period appears after the write in period p. The blank period is a period during which write in and read out of the image signal is not performed.

The image signal input to the first SDRAM 103 in the write in period p is then read out two times, in a first read out period p and in a second read out period p, after the blank period is completed.

Further, the image signal is written to the second SDRAM 104 in a write in period (p−1). A blank period then appears when the write in period (p−1) is completed. After completion of the blank period, the image signal input to the second SDRAM 104 in the write in period (p−1) is then read out two times, in a first read out period (p−1) and in a second read out period (p−1).

The write in period p, and the first and the second read out periods (p−1) appear at the same time. Namely, the image signal is read out two times from the second SDRAM 104 while the image signal is input to the first SDRAM 103.

Further, a write in period (p+1), and the first and the second read out periods p appear at the same time. Namely, the image signal is read out two times from the first SDRAM 103 while the image signal is input to the second SDRAM 104.

A write in period (p+2) appears when the first and the second read out periods p are completed, and the image signal is again written to the first SDRAM 103, and at the same time, first and second read out periods (p+1) appear, and the image signal is therefore read out two times from the second SDRAM 104.

It is necessary that the length of the blank period be longer than the length calculated by subtracting the write in period from the sum of the first and the second read out periods. Any number of blank periods may be formed, provided that there is no image flicker. By forming the blank period, the image signal is not written to two or more SDRAMs, and the image signal is not read out from two or more SDRAMs.

Note that the blank period may also be formed between the write in period and the first read out period, and may also be formed between the second read out period and the write in period. Further, the blank period may also be formed between the first read out period and the second read out period.

The image signal read out twice is then input to the data format portion 105.

Note that it is possible to freely combine Embodiment 2 with Embodiment 1.

Embodiment 3

Figure 12:
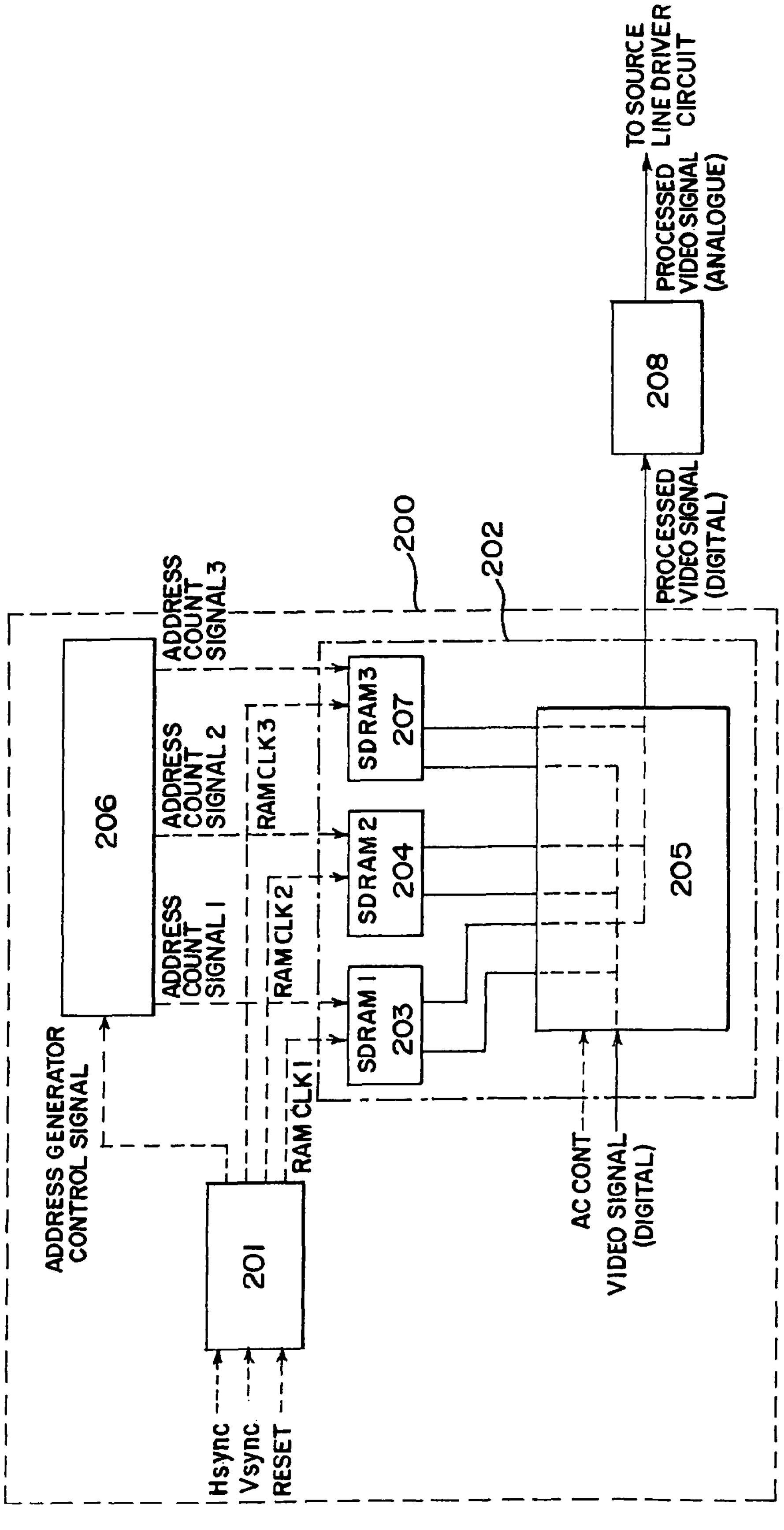
FIG. 12 is a block diagram of a frame rate conversion portion of a semiconductor display device of the present invention

An example of a frame rate conversion portion, differing from that of FIG. 1, of a semiconductor display device of the present invention is explained in Embodiment 3 using FIG. 12.

The frame rate conversion portion has there SDRAMs in Embodiment 3.

A frame rate conversion portion 200 has a control portion 201, a frame frequency conversion portion 202, and an address generator portion 206. Further, the frame frequency conversion portion 202 has a first SDRAM (SDRAM 1) 203, a second SDRAM (SDRAM 2) 204, a third SDRAM (SDRAM 3) 207, and a date format portion 205. Reference numeral 208 denotes a D/A converter circuit, which converts an image signal output from the frame rate conversion portion 200 from digital to analog.

Note that although the frame frequency conversion portion 202 has three SDRAMs (the first SDRAM 203, the second SDRAM 204, and the third SDRAM 207) in Embodiment 3, the number of SDRAMs is not limited to three.

An Hsync signal, a Vsync signal, and a CLK signal are input to the control portion 201. An address generator control signal for controlling drive of the address generator portion, and SDRAM control signals RAM CLK1, RAM CLK2, and RAM CLK3 for controlling drive of the first SDRAM 203, the second SDRAM 204, and the third SDRAM 207 are output from the control portion 201 in accordance with the Hsync signal, the Vsync signal, and the CLK signal.

The address generator portion 206 is driven in accordance with the address generator control signal input from the control portion 201, and determines counter values for specifying the memory address locations of the first SDRAM 203, the second SDRAM 204, and the third SDRAM 207. For example, if the counter value is 0, then each memory address location 0 of the first SDRAM 203, the second SDRAM 204, and the third SDRAM 207 is specified. If the counter value is 1, then the memory address location 1 is specified, if the counter value is 2, the memory address location 2 is specified; the memory address location q is specified if the counter value is q. Counter value information is input to the first SDRAM 203, to the second SDRAM 204, and to the third SDRAM 207 from the address generator portion 206 as a first counter signal (address count signal 1), as a second counter signal (address count signal 2), and as a third counter signal (address count signal 3), respectively.

Note that the counter value of the first counter signal is referred to as a first counter value, the counter value of the second counter signal is referred to as a second counter value, and the counter value of the third counter signal is referred to as a third counter value.

A digital image signal (video signal) is input to the data format portion 205. Further, the data format portion 205 is connected to an alternating current electric power source (AC Cont).

The digital image signal input to the data format portion 205 is written into specified locations of the first, the second, and the third SDRAMs 203, 204, and 207, in order. The digital image signal is not input to a plurality of SDRAMs at the same time, but is always written to only one SDRAM.

The number of bits of the digital video signal input to the data format portion 205 may also be increased, and then written to the first SDRAM 203, to the second SDRAM 204, and to the third SDRAM 207.

The input image signal is next read out in order from locations of the first, the second, and the third SDRAMs 203, 204, and 207. The digital image signal is not output from a plurality of SDRAMs at the same time, but is always output from only one SDRAM.

Note that output of the image signal is performed twice. Input of the image signal to one SDRAM is then performed while output of the image signal from another SDRAM is performed.

Figure 13:
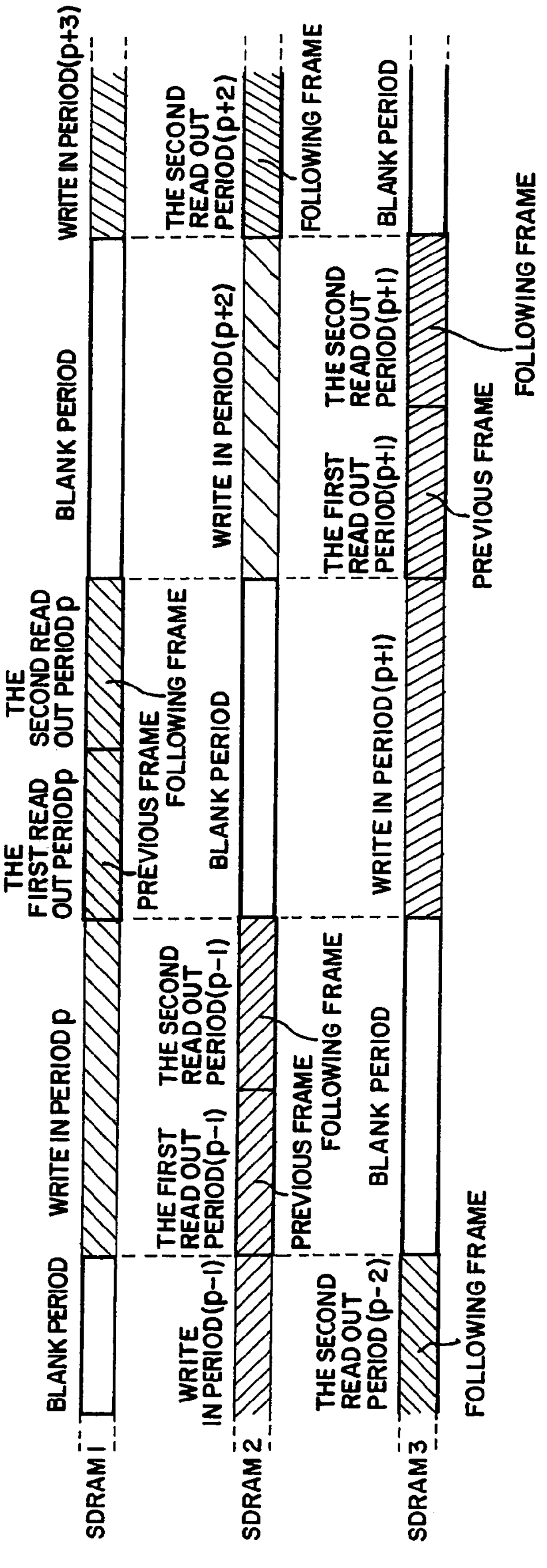
FIG. 13 is a diagram showing timing for input and output of an image signal to and from an SDRAM.

Image signal input and output timing in the first SDRAM 203, the second SDRAM 204, and the third SDRAM 207 are shown in FIG. 13.

An image signal is written to the first SDRAM 203 in a write in period p. The image signal input to the first SDRAM 203 during the write in period p is then read out two times, during a first read out period p and during a second read out period p.

Further, the image signal is written to the second SDRAM 204 in a write in period (p−1). The image signal input to the second SDRAM 204 during the write in period (p−1) is then written out two times, during a first read out period (p−1) and during a second readout period (p−1).

The image signal is written to the third SDRAM 207 in a write in period (p+1). The image signal input to the third SDRAM 207 during the write in period (p+1) is then read out two times, during a first read out period (p+1) and a second read out period (p+1).

The write in period p and the first and the second read out periods (p−1) appear simultaneously. Namely, the image signal is read out two times from the second SDRAM 204 while write in of the image signal to the first SDRAM 203 is performed.

Further, the write in period (p+1) and the first and the second read out periods p appear simultaneously. Namely, the image signal is read out two times from the first SDRAM 203 while write in of the image signal to the third SDRAM 207 is performed.

In addition, a write in period (p+2) and the first and the second readout periods (p+1) appear simultaneously. Namely, the image signal is read out two times from the third SDRAM 207 while write in of the image signal to the second SDRAM 204 is performed.

A blank period appears when the first and the second read out periods p are completed. During the blank period of the first SDRAM 203, the second SDRAM 204 is in the write in period (p+2), and the third SDRAM 207 is in the first and the second read out periods (p+1).

A blank period appears when the first and the second read out periods (p−1) are completed. During the blank period of the second SDRAM 204, the third SDRAM 207 is in the write in period (p+1), and the first SDRAM 203 is in the first and the second read out periods p.

A blank period appears when the first and the second read out periods (p+1) are completed. During the blank period of the third SDRAM 207, the first SDRAM 203 is in a write in period (p+3), and the second SDRAM 204 is in the first and the second read out periods (p+2).

The next write in periods begin in each of the first SDRAM 203, of the second SDRAM 204, and of the third SDRAM 207, after the blank periods are completed.

The image signal that has been read out two times is then input to the data format portion 205. One of the image signals, from among the image signals read out two times, then undergoes data processing in the data format portion 205 so that its polarity is inverted, with the electric potential of an opposing electrode of liquid crystals as a reference, when converted into analog. The two image signals, the data processed image signal and the image signal that has not undergone data processing, are then output from the data format portion 205.

The two image signals output from the data format portion 205 are then input to the D/A converter circuit 208 and converted to analog. The two image signals that have been converted to analog have inverted polarities, with the electric potential of an opposing electrode as a reference. The two image signals converted to analog are then input sequentially to a source signal line driver circuit.

Note that the image signals may be converted serial to parallel in the data format portion 205, divided into a number of divisions corresponding to divided drive, and then input to the D/A converter circuit 208.

The structure of an active matrix liquid crystal display device using the method of driving of the present invention, and the polarity of display signals input to the pixel portion, are the same as those shown in FIGS. 4 to 9, and an explanation is therefore omitted in Embodiment 3.

Note that write in and read out of the image signal in the first SDRAM 203, the second SDRAM 204, and the third SDRAM 207 of FIG. 12 is not limited to being performed at the timing shown in FIG. 13. The first and the second read out periods may also be make longer than, or shorter than, the write in period. However, it is very important to adjust the length of the blank period so that the image signal is not written to two or more SDRAMs, and that the image signal is not read out form two or more SDRAMs.

Further, the blank period may also be formed between the write in period and the first read out period, and it may also be formed between the second read out period and the write in period. The blank period may also be formed between the first read out period and the second read out period.

The image signals read out twice are input to the data format portion 205.

Embodiment 4

Figure 14:
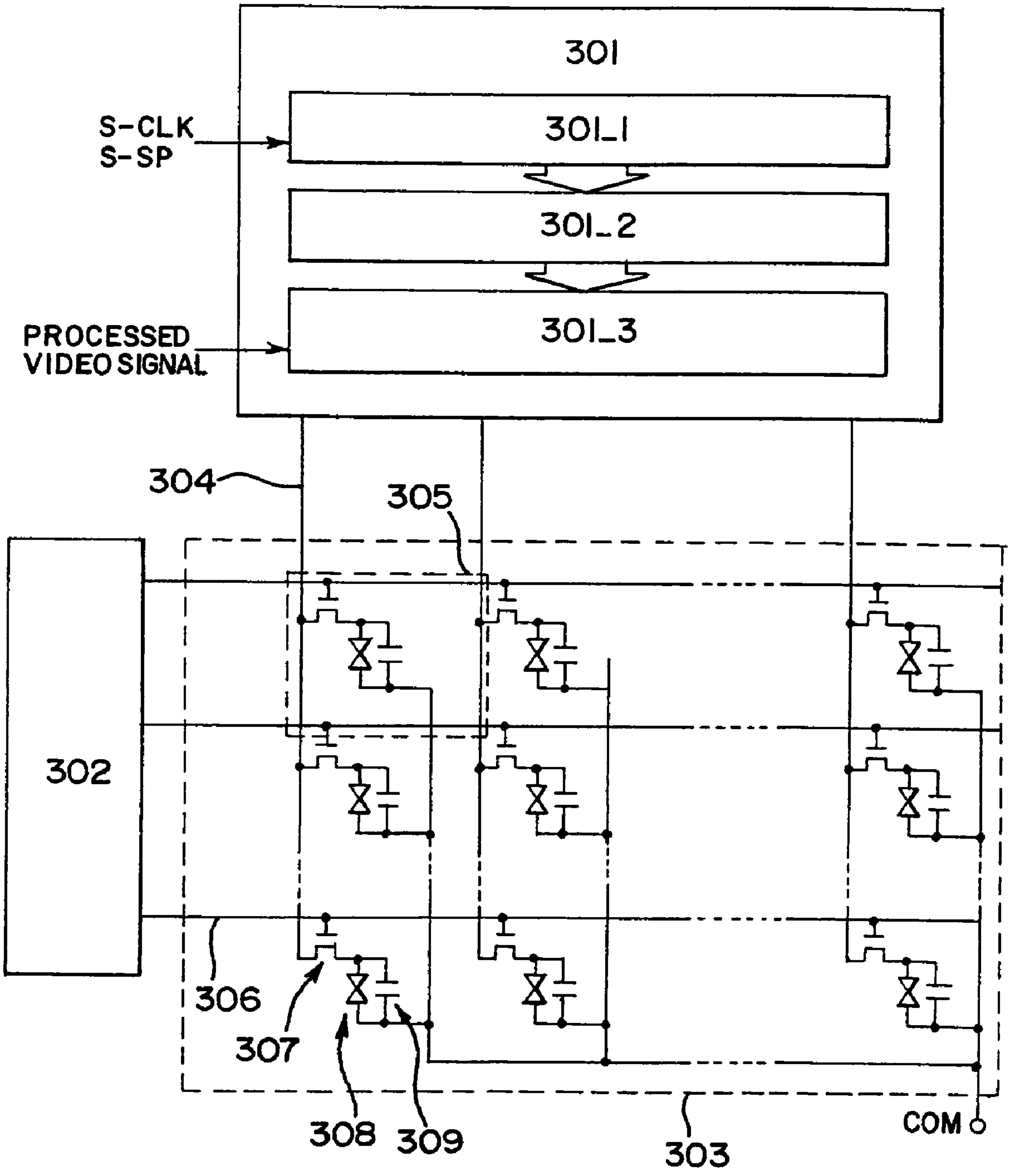
FIG. 14 is a diagram of a pixel portion and a driver circuit of an analog drive semiconductor display device of the present invention.

A detailed structure of a semiconductor display device of the present invention driven by an analog method is explained in Embodiment 4. FIG. 14 is a block diagram of an example of a semiconductor display device of the present invention driven by an analog method.

Reference numeral 301 denotes a source signal line driver circuit, reference numeral 302 denotes a gate signal line driver circuit, and reference numeral 303 denotes a pixel portion. There are formed one source signal line driver circuit and one gate signal line driver circuit in Embodiment 4, but the present invention is not limited to this structure. Two source signal line driver circuits may also be formed, and two gate signal line driver circuits may also be formed.

The source signal line driver circuit 301 has a shift register 301_1, a level shifter 301_2, and a sampling circuit 301_3. Note that the level shifter 301_2 may be used when necessary, and that it need not always be used. Further, a structure is used in Embodiment 4 in which the level shifter 301_2 is formed between the shift register 301_1 and the sampling circuit 301_3, but the present invention is not limited to this structure. A structure in which the level shifter 301_2 is incorporated within the shift register 301_1 may also be used.

Source signal lines 304 connected to the source signal line driver circuit 301, and gate signal lines 306 connected to the gate signal line driver circuit 302 intersect in the pixel portion 303. Thin film transistors (pixel TFTs) 307 of pixels 305, liquid crystal cells 308 sandwiching liquid crystals between an opposing electrode and a pixel electrode, and storage capacitors 309 are formed in regions surrounded by the source signal lines 304 and the gate signal lines 306. Note that, although a structure is shown in Embodiment 4 in which the storage capacitors 309 are formed, it is not always necessary to form the storage capacitors 309.

Further, the gate signal line driver circuit 302 has a shift register and a buffer (neither shown in the figures). The gate signal line driver circuit 302 may also have a level shifter.

A source clock signal S-CLK as panel control signal, and a source start pulse signal S-SP are input to the shift register 301_1. A sampling signal for sampling a display signal is output from the shift register 301_1. The output sampling signal is input to the level shifter 301-2, the amplitude of its electric potential is made larger, and it is output.

The sampling signal output from the level shifter 301_2 is input to the sampling circuit 301_3. An image signal is input to the sampling circuit 301_3 at the same time, through an image signal line (not shown in the figures).

Each of the input image signals is sampled in the sampling circuit 301_3 in accordance with the sampling signal, and then input to the source signal lines 304 as a display signal.

The pixel TFTs 307 are placed in an On state in accordance with selection signals input from the gate signal line driver circuit 302 through the gate signal lines 306. The sampled display signals input to the source signal lines 304 are then input to the pixel electrodes of predetermined pixels 305, through the pixel TFTs 307 in the ON state.

The liquid crystals are driven by the electric potential of the input display signal, the amount of light transmitted is controlled, and portions of the image are displayed in the pixels 305 (portions corresponding to each pixel).

Note that it is possible to freely combine Embodiment 4 with any of Embodiments 1 to 3.

Embodiment 5

A detailed structure of the source signal line driver circuit 301 shown by Embodiment 4 is explained in Embodiment 5. Note that the source signal line driver circuit shown by Embodiment 4 is not limited to the structure shown in Embodiment 5.

Figure 15:
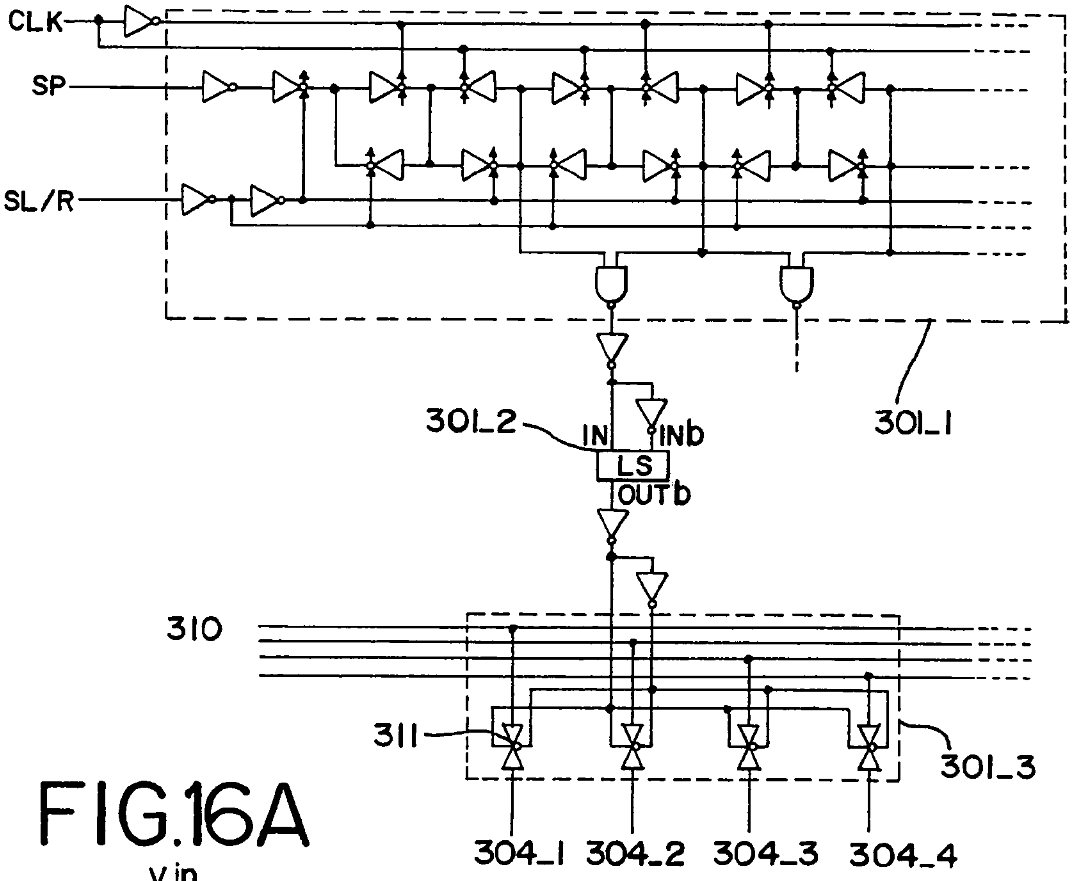
FIG. 15 is a circuit diagram of a source signal line driver circuit.

FIG. 15 shows a circuit diagram of the source signal line driver circuit of Embodiment 5. Reference numeral 301_1 denotes the shift register, reference numeral 301_2 denotes the level shifter, and reference numeral 301_3 denotes the sampling circuit.

The source clock signal S-CLK, the source start pulse signal S-SP and a drive direction switch signal SL/R are each input to the shift register 301_1 from wirings shown in the figure. Image signals are input to the sampling circuit 301_3 through image signal lines 310. An example of a case of divided drive with 4 divisions is shown in Embodiment 5. Four image signal lines 310 therefore exist. However, Embodiment 5 is not limited to this structure, and the number of divisions can be set arbitrarily.

The image signals input to each image signal line 310 are sampled in accordance with a sampling signal input from the level shifter 301_2 in the sampling circuit 301-3. Specifically, the image signals are sampled in analog switches 311 of the sampling circuit 301_3, and are input simultaneously to corresponding source signal lines 304_1 to 304_4.

Display signals are input to all of the source signal lines by repeating the above operations.

Figure 16A:
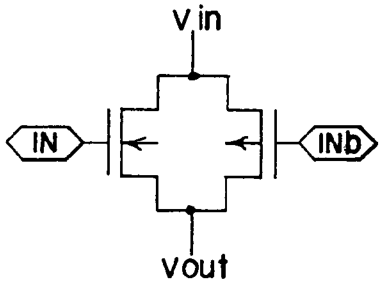
FIGS. 16A and 16B are circuit diagrams of an analog switch and a level shift circuit.

FIG. 16A shows an equivalent circuit diagram of the analog switch 311. The analog switch 311 has an n-channel TFT and a p-channel TFT. The image signal is input as Vin from the wiring shown in the figure. A sampling signal output from the level shifter 301_2, and a signal having a polarity which is the inverse of the sampling signal, are then input from IN and from INb, respectively. The image signal is sampled in accordance with the sampling signal, and output as a display signal from Vout.

Figure 16B:
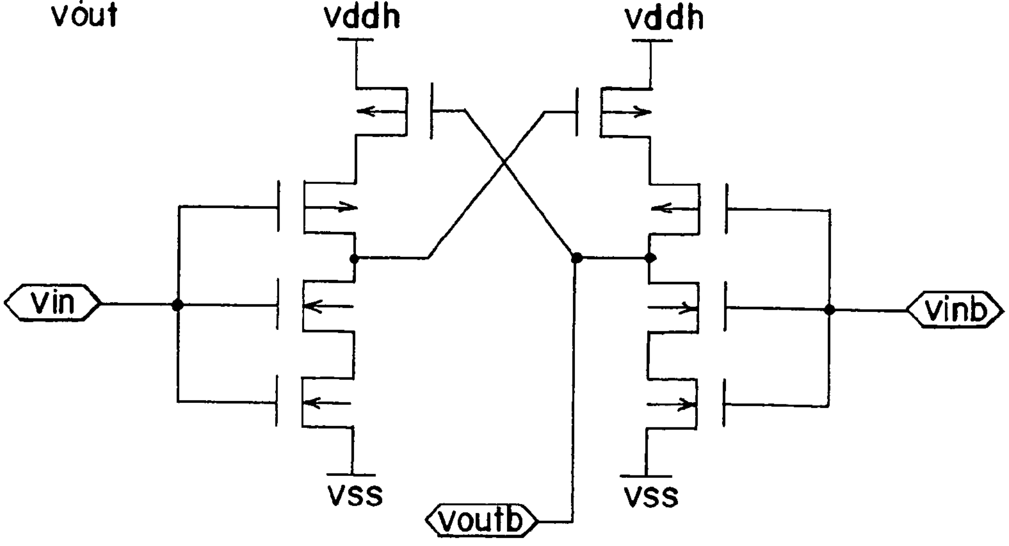

FIG. 16B shows an equivalent circuit diagram of the level shifter 301_2. The sampling signal output from the shift register 301_1, and the signal having a polarity which is the inverse of the sampling signal, are input from Vin and Vinb, respectively. Further, reference symbol Vddh denotes application of a positive voltage, and reference symbol Vss denotes application of a negative voltage. The level shifter 301_2 is designed such that a signal input to Vin is made high-voltage, inverted, and output from Voutb. In other words, a signal corresponding to Vss is output from Voutb if Hi is input to Vin, and a signal corresponding to Vddh is output from Voutb if Lo is input.

Note that it is possible to freely combine Embodiment 5 with any of Embodiments 1 to 4.

Embodiment 6

A frame rate conversion portion of a semiconductor display device of the present invention is explained below using FIG. 17.

Figure 17:
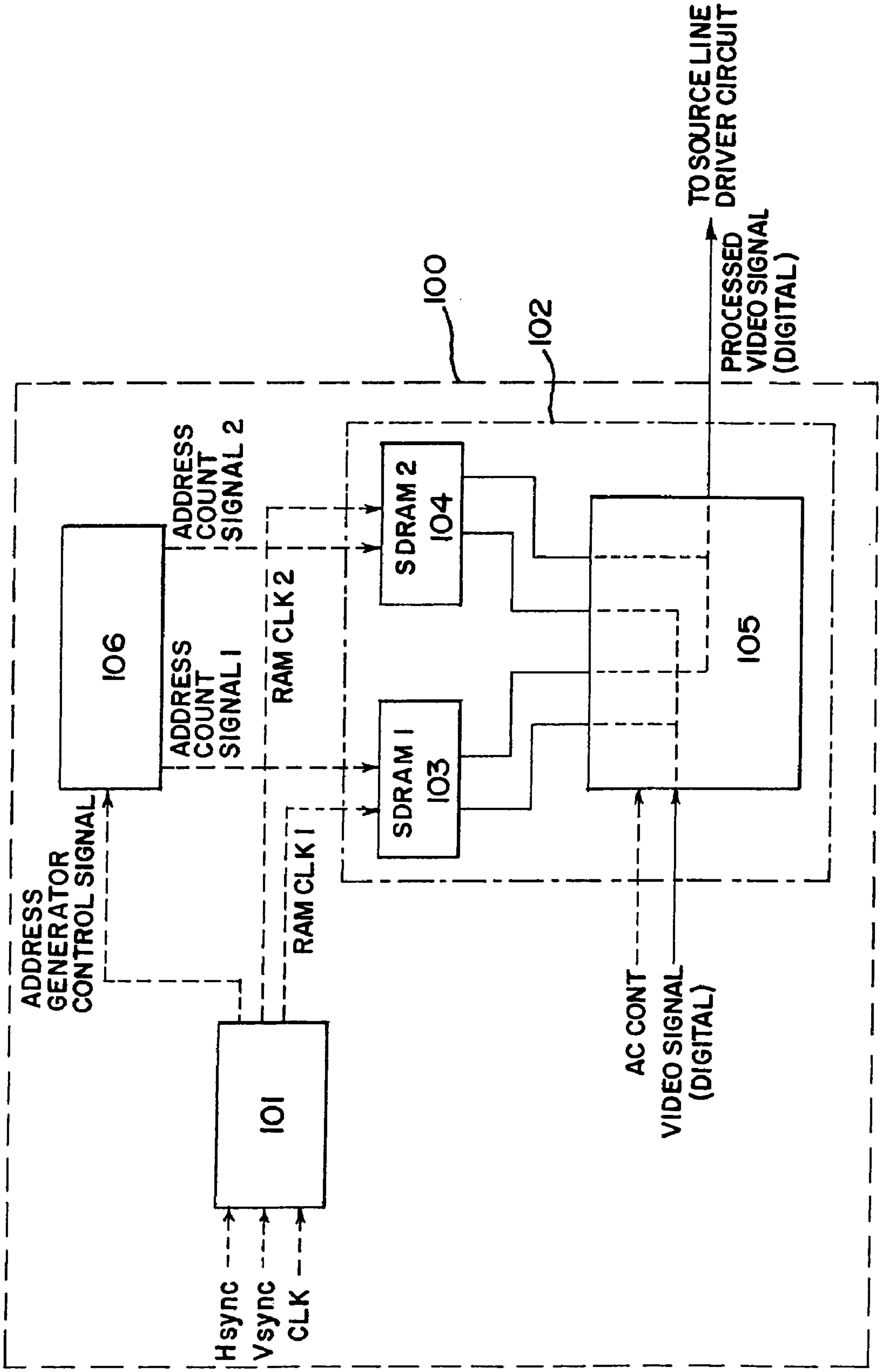
FIG. 17 is a block diagram of a frame rate conversion portion of a semiconductor display device of the present invention.

The frame rate conversion portion 100 shown in FIG. 17 is the same as that shown in FIG. 1, and therefore the embodiment mode may be referred to a detailed explanation of its operation and structure. However, an image signal output from the frame rate conversion portion 100 is not input to a D/A converter circuit in Embodiment 6. It is input as is in a digital state to a source signal line driver circuit.

Note that the number of SDRAMs is not limited to two, and any number may be formed, provided that the number is equal to or greater than two.

Figure 18:
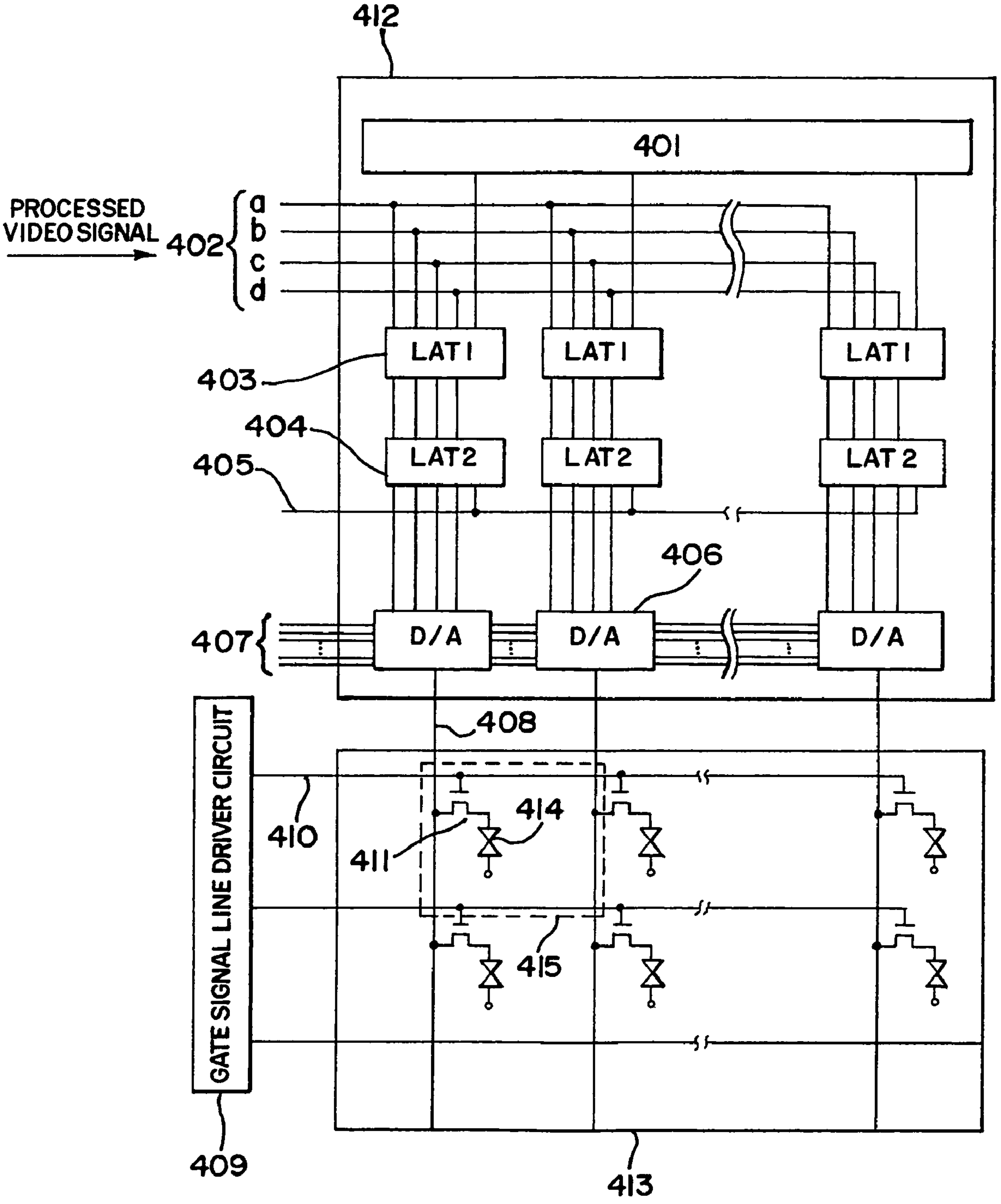
FIG. 18 is a diagram of a pixel portion and a driver circuit of a digital drive semiconductor display device of the present invention.

A semiconductor display device driven by a digital method used in Embodiment 6 is explained using FIG. 18.

A block diagram of an semiconductor display device of the present invention driven by a digital method is shown in FIG. 18. An example of an semiconductor display device with a 4-bit digital drive method is taken here. Note that the digital drive method semiconductor display device used by Embodiment 6 is not limited to the structure shown in FIG. 18. The semiconductor display device may have any type of structure, provided that display can be performed using a digital image signal.

A source signal line driver circuit 412, a gate signal line driver circuit 409, and a pixel portion 413 are formed in the digital drive method semiconductor display device, as shown in FIG. 18.

A shift register 401, a latch 1 (LAT1) 403, a latch 2 (LAT2) 404, and a D/A converter circuit 406 are formed in the source signal line driver circuit 412. A digital image signal from the frame rate conversion portion 100 is input to address lines 402*a* to 402*d*.

The address lines 402*a* to 402*d* are connected to the latch 1 (LAT1) 403. Further, a latch pulse line 405 is connected to the latch 2 (LAT2) 404, and a gray scale voltage line 407 is connected to the D/A converter circuit 406.

Note that, for convenience, the latch 1 403 and the latch 2 404 (LAT1 and LAT2) are each shown as compilations of four latches in Embodiment 6.

Source signal lines 408 connected to the D/A circuit 406 of the source signal line driver circuit 412, and gate signal lines 410 connected to the gate signal line driver circuit 409 are formed in the pixel portion 413.

Pixels 415 are formed in the pixel portion 413 in portions at which the source signal lines 408 and the gate signal lines 410 intersect, and the pixels 415 each have a pixel TFT 411 and a liquid crystal cell 414.

Digital image signals supplied to the address lines 402*a* to 402*d* are written one after another to all of the LAT1s 403 in accordance with a timing signal from the shift register 401. Note that all of the LAT1s 403 are referred to by the generic name LAT1 group in this specification.

A period until write in of the digital image signal to the LAT1 group is completed once is referred to as one line period. In other words, the period from when write in of the digital image signal to the leftmost LAT1 begins, to the completion of write in of the digital image signal in the rightmost LAT1 is one line period. Note that the period until write in of the digital image signal to the LAT1 group is completed once may also be combined with a horizontal return period and taken as one line period.

The digital image signal input to the LAT1 group is then transferred all at once to each of the LAT2s 404, and written in, after write in of the digital image signal to the LAT1 group is completed. Note that all of the LAT2s are referred to by the generic name LAT2 group in this specification.

After the digital image signal is transferred to the LAT2 group, a second line period begins. Write in of the digital signal supplied to the address lines 402*a* to 402*d* is then performed again, in order, in the LAT1 group in accordance with the timing signal from the shift register 401.

The digital image signal written to the LAT2 group is input all at once to the D/A converter circuit 406 at the start of the second one line period. The input digital image signal is then converted in the D/A converter circuit 406 to an analog display signal having voltages corresponding to the image information of the digital image signal, and is input to the source signal lines 408.

Switching of the corresponding pixel TFTs 411 is performed in accordance with a selection signal output from the gate signal line driver circuit 409, and the liquid crystal molecules are driven in accordance with the analog display signal input to the source signal lines 408.

The polarity of the analog display signal output form the D/A converter circuit 406 is changed in Embodiment 6 by changing the value of the image signal input to the address lines 402 for each frame period.

Note that it is possible to freely combine Embodiment 6 with any of Embodiments 1 to 3.

Embodiment 7

An example of manufacturing method of the liquid crystal display device which is one of the semiconductor display device of the present invention will be described with reference to FIGS. 19, and 22. In particular, a method for simultaneously forming a pixel TFT and a storage capacitor in a pixel portion as well as a TFT in a driver circuit to be disposed in the peripheral portion of the pixel portion will be described according to steps in detail.

Figure 19A:
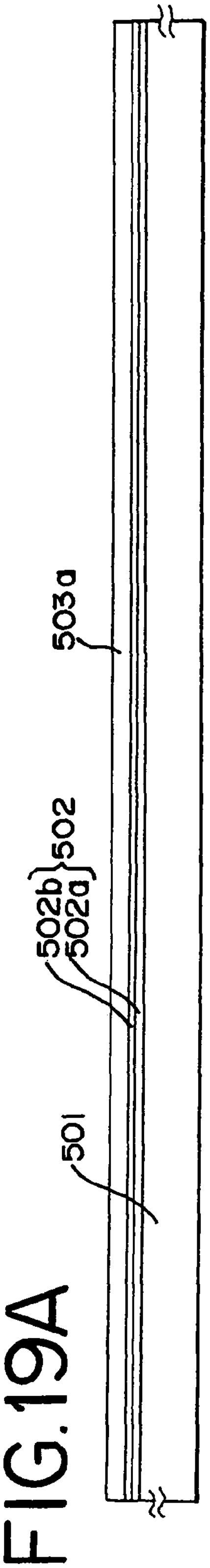
FIGS. 19A to 19D are diagrams showing a process of manufacturing a semiconductor display device.

In FIG. 19A, as a substrate 501, a glass substrate made of, e.g., barium borosilicate glass, aluminum borosilicate glass, such as a #7059 glass or a #1737 glass available from Corning, may be used. Alternatively, a quartz substrate may be used as the substrate 501. In the case where the glass substrate is employed, the substrate 501 may be heat treated in advance at a temperature lower than the glass deformation temperature by about 10 to 20° C. Then, an underlying film 502 made of an insulating film such as a silicon oxide film, a silicon nitride film, or a silicon oxynitride film is formed on a surface of the substrate 501 in which a TFT is to be formed, in order to prevent impurities from being diffused from the substrate 501. For example, a silicon oxynitride film 502*a* is formed from $SiH_4$, $NH_3$, and $N_2O$ with a plasma CVD method to have a thickness of 10 to 200 nm (preferably 50 to 100 nm), and then a hydrogenated silicon oxynitride film 502*b* is formed similarly from $SiH_4$ and $N_2O$ to have a thickness of 50 to 200 nm (preferably 100 to 150 nm). Although the underlying film 502 is described to have a two-layer structure, a single layer of an insulating film may be deposited. Alternatively, two or more layers of insulating films may be deposited as the underlying film 502.

A silicon oxynitride film 502*a* is formed with a parallel-plate type plasma CVD method. For forming the silicon oxynitride film 502*a*, $SiH_4$ of 16 sccm, $NH_3$ of 100 sccm, and $N_2O$ of 20 sccm are introduced into the reaction chamber. Other parameters are set as follows: a substrate temperature of 325° C., a reaction pressure of 40 Pa, a discharge power density of 0.41 W/cm$^2$, and a discharge frequency of 60 MHz. On the other hand, for forming the hydrogenated oxynitride silicon film 502*b*, $SiH_4$ of 5 sccm, $N_2O$ of 120 sccm, and $H_2$ of 125 sccm are introduced into the reaction chamber. Other parameters are set as follows: a substrate temperature of 400° C., a reaction pressure of 20 Pa, a discharge power density of 0.41 W/cm$^2$, and a discharge frequency of 60 MHz. These two films can be continuously formed only by changing the substrate temperature and switching the reaction gases to be used.

The thus formed oxynitride silicon film 502*a* has a density of $9.28\times10^{22}$/cm$^3$. This is a fine and hard film that exhibits a slow etching rate of about 63 nm/min at 20° C. against a mixture solution (available from Stella Chemifa under commercial designation of LAL500) which contains hydrogen fluoride ammonium ($NH_4HF_2$) of 7.13% and ammonium fluoride ($NH_4F$) of 15.4%. Such a film used as the underlying film is effective for preventing alkaline metal elements from being diffused from the glass substrate into the semiconductor layer formed on the underlying film.

Then, a semiconductor layer 503*a* with a thickness of 25 to 100 nm (preferably 30 to 60 nm) and having an amorphous structure is formed with a plasma CVD method, a sputtering method, or the like. A semiconductor film having an amorphous structure includes an amorphous semiconductor film and a microcrystalline semiconductor film. Alternatively, a compound semiconductor film having an amorphous structure such as an amorphous silicon germanium film may be employed. In the case where the amorphous silicon film is formed with a plasma CVD method, it is possible to continuously form both of the underlying film 502 and the amorphous semiconductor layer 503*a*. For example, after depositing the silicon oxynitride film 502*a* and the hydrogenated silicon oxynitride film 502*b* with a plasma CVD method as set forth above, the reaction gases are switched from the combination of $SiH_4$, $N_2O$ and $H_2$ to the combination of $SiH_4$ and $H_2$, or only $SiH_4$. Then, these films can be continuously deposited without being exposed to the ambient atmosphere. As a result, surface contamination of the hydrogenated silicon oxynitride film 502*b* can be prevented, and variations in the characteristics and/or a threshold voltage of the resultant TFTs can be reduced.

Thereafter, a crystallization process is performed to form a crystalline semiconductor layer 503*b* from the amorphous semiconductor layer 503*a*. For that purpose, various methods such as a laser annealing method, a thermal annealing method (a solid phase growth method), or a rapid thermal annealing method (RTA method) can be employed. In the case where the glass substrate or a plastic substrate that has poor heat-resistivity is to be employed, a laser annealing method is especially preferable to be performed. In the RTA method, an infrared lamp, a halogen lamp, a metal halide lamp, a Xenon lamp or the like is used as a light source. Alternatively, in accordance with the technique disclosed in Japanese Patent Application Laid-Open No. Hei 7-130652, the crystalline semiconductor layer 503*b* may be formed through a crystallization process employing metal elements. Further, the crystalline semiconductor layer 503*b* may also be formed through a crystallization process employing a laser annealing method and metal elements. In the crystallization process, it is preferable to allow the hydrogens contained in the amorphous semiconductor layer to be first purged. For that purpose, a heat process is performed at 400 to 500° C. for about one hour, so that the amount of hydrogens contained in the amorphous semiconductor layer is reduced to 5 atom % or lower. By performing the crystallization process thereafter, the surface of the resultant crystallized film can be prevented from being roughened.

Alternatively, when an $SiH_4$ gas and an Ar gas are used as the reaction gases and the substrate temperature is set at 400 to 450° C. during the formation process of the amorphous silicon film with the plasma CVD method, the amount of hydrogens contained in the amorphous silicon film can be reduced to 5 atomic % or lower. In such a case, no heat treatment is required to be performed for purging the contained hydrogens.

Figure 19B:
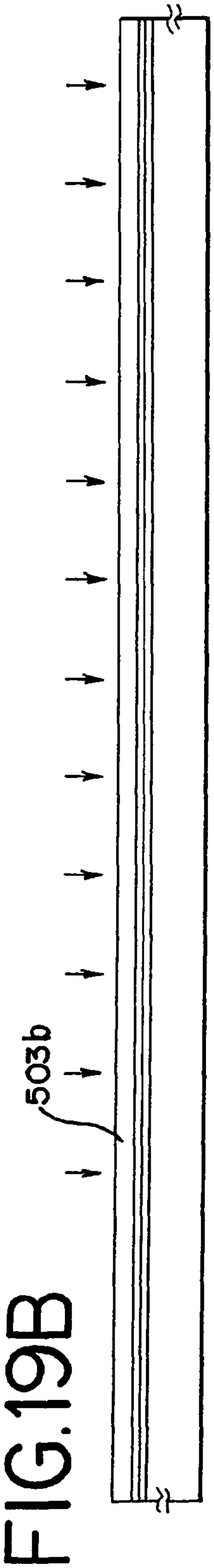

In a case that a crystallization is performed by a laser annealing method, the excimer laser and the argon laser or the like of a pulse oscillating type or the continuous oscillation type is used as the light source. In a case that an excimer laser of a pulse oscillating type is used, laser annealing is performed by processing a laser light into a linear shape. The conditions of the laser annealing are appropriately selected by an operator. For example, a laser pulse oscillation frequency is set to 300 Hz, and a laser energy density is set from 100 to 500 mJ/cm$^2$ (typically 300 to 400 mJ/cm$^2$). Then, a linear beam is irradiated over the entire surface of the substrate, the overlapping ratio of the linear beam at this time is set as 50 to 90%. Thus, as shown in FIG. 19B, the crystalline semiconductor layer 503*b* is obtained.

Figure 19C:
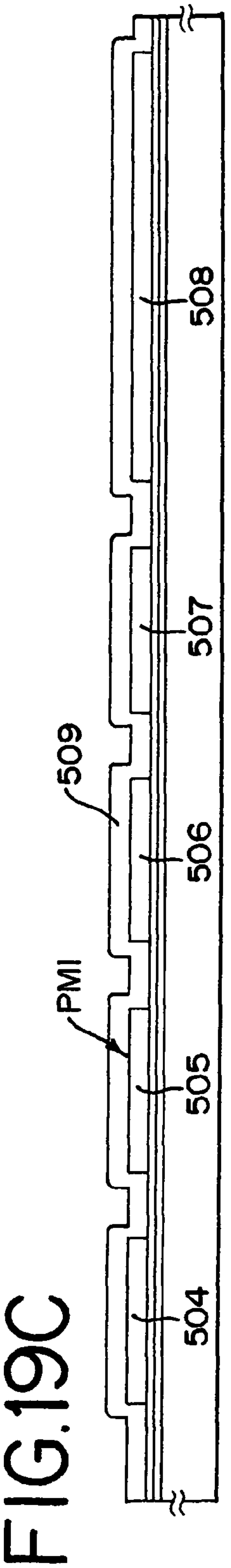

Then, a resist pattern is formed on the crystalline semiconductor layer 503*b* with a photolithography technique by employing a first photomask (PM1). The crystalline semiconductor layer is divided into island-patterns by dry-etching to form island-shaped semiconductor layers 504 to 508, as shown in FIG. 19C. For the dry etching process of the crystalline silicon film, a mixture gas of $CF_4$ and $O_2$ is used.

Thereafter, impurity elements providing the p-type conductivity are added to the entire surfaces of the island-shaped semiconductor layers at the concentration of about $1\times10^{16}$ to $5\times10^{17}$ atoms/cm$^3$ for the purpose of controlling a threshold voltage (Vth) of TFTs. As the impurity elements providing the semiconductor with the p-type conductivity, elements in Group 13 in the periodic table, such as boron (B), aluminum (Al), and gallium (Ga) are known. As the method for adding the impurity elements, the ion injecting method and the ion doping method (or the ion shower doping method) as mentioned above is suitable. For the large sized substrate, the ion doping method is suitable. With the ion doping method, boron (B) is added by employing using diborane ($B_2H_6$) as a source material gas. These doping impurity elements can be though omitted, because it is not always necessary, the process preferably employed for setting a threshold voltage of, especially an n-channel TFT, within a predetermined range.

The gate insulating film 509 is formed by depositing an insulating film containing silicon to have a film thickness of 40 to 150 nm with a plasma CVD method or a sputtering method. In this embodiment, the gate insulating film 509 is formed of a silicon oxynitride film having a thickness of 120 nm. The silicon oxynitride film formed with the source material gases obtained by adding $O_2$ into $SiH_4$ and $N_2O$ is a suitable material for the purpose since the fixed charge density in the film is reduced. Furthermore, the silicon oxynitride film formed with the source material gases of $SiH_4$ and $N_2O$ as well as $H_2$ is preferable since the interface defect density at the interface with the gate insulating film can be reduced. It should be noted that the gate insulating film is not limited to such a silicon oxynitride film, but a single-layer structure or a multilayer structure of other insulating films containing silicon may be used. For example, in the case where a silicon oxide film is used, the film can be formed with a plasma CVD method in which TEOS (Tetraethyl Orthosilicate) and $O_2$ are mixed to each other, and a discharge is generated with a reaction pressure of 40 Pa, a substrate temperature of 300 to 400° C., and a high frequency (13.56 MHZ) power density of 0.5 to 0.8 W/cm$^2$. The thus formed silicon oxide film can exhibit satisfactory characteristics as a gate insulating film by being subjected to a thermal annealing process at 400 to 500° C. (See FIG. 19C.)

Figure 19D:
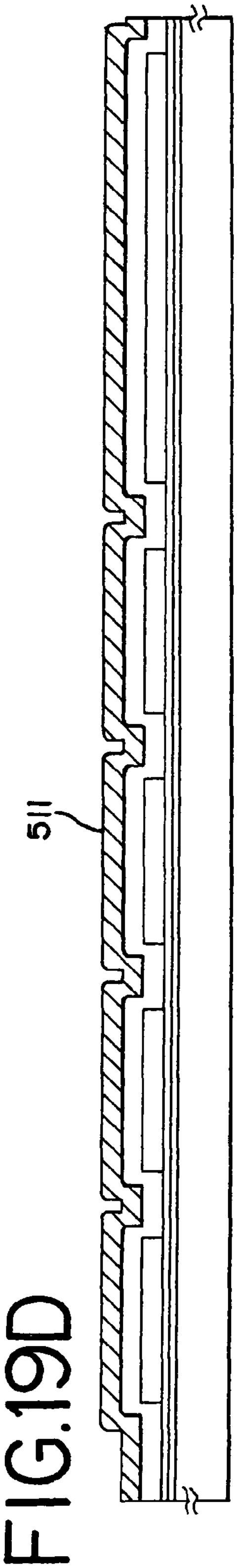

Thereafter, as shown in FIG. 19D, a heat-resistant conductive layer 511 for forming a gate electrode is formed on the gate insulating film 509 with a first shape so as to have a thickness of 200 to 400 nm (preferably 250 to 350 nm). The heat-resistant conductive layer 511 may be a single layer, or alternatively, have a layered-structure including a plurality of layers such as two or three layers, if necessary. The heat-resistive conductive layer in the present specification includes a film made of elements selected from the group consisting of Ta, Ti, and W, an alloy film including the aforementioned elements as constituent components, or an alloy film in which the aforementioned elements are combined. These heat-resistive conductive layers can be formed with a sputtering method or a CVD method, and it is preferable to reduce the concentration of impurities contained therein in order to obtain a low resistance. Especially, the oxygen concentration is preferably set to be at 30 ppm or lower. In this embodiment, the W film may be formed to have a thickness of 300 nm. The W film may be formed with a sputtering method employing a W target, or with a thermal CVD method employing hexafulouride tungsten ($WF_6$). In either case, the resistance of the film is required to be lowered in order to be used as a gate electrode, so that the resistivity of the resultant W film is preferably set to be at 20 μΩcm or lower. The W film can have a lower resistivity with a larger grain size. However, when a larger amount of impurity elements such as oxygens is contained in the W film, crystallization is adversely affected to cause high resistance. Thus, in the case where a sputtering method is employed to form a W film, a W target with the purity of 99.9999% or 99.99% are employed, and sufficient attention is paid so as to prevent impurities from being mixed into the W film from the ambient atmosphere during the deposition, thereby resulting in a resistivity of 9 to 20 μΩcm.

On the other hand, in the case where a Ta film is used as the heat-resistive conductive layer 511, the film can be similarly formed with a sputtering method. For the Ta film, an Ar gas is used as a sputtering gas. In addition, when an appropriate amount of Xe or Kr is added into the gas during the sputtering process, an internal stress of the resultant film can be relaxed so that the film can be prevented from being peeled off. The resistivity of the α-phase Ta film is about 20 μΩ cm, and thus can be used as a gate electrode. However, the β-phase Ta film has the resistivity of about 180 μΩ cm, which is not suitable for forming a gate electrode. Since the TaN film has a crystal structure close to that of the α-phase Ta film, the α-phase Ta film can be easily obtained by forming the underlying TaN film prior to the deposition of the Ta film. In addition, although not illustrated, it is effective to form a silicon film having a thickness of about 2 to 20 nm and doped with phosphorus (P) below the heat-resistive conductive layer 511. Thus, close adhesion to the overlying conductive film as well as prevention of oxidation can be realized, and furthermore, alkaline metal elements contained in the heat-resistive conductive layer 511 at a minute amount can be prevented from being diffused into the gate insulating film 509 having the first shape. In either case, it is preferable to set the resistivity of the heat-resistive conductive layer 511 in the range from 10 to 50 μΩ cm.

Then, other masks 512 to 517 made of a resist are formed with a photolithography technique by employing a second photomask (PM2). A first etching process is then performed. In this embodiment, an ICP etching apparatus is employed with $Cl_2$ and $CF_4$ as etching gases, and the etching is performed by forming plasma with an applied RF (13.56 MHz) power of 3.2 mW/cm$^2$ under a pressure of 1 Pa. An RF (13.56 MHz) power of 224 mW/cm$^2$ is also applied to the substrate (to a sample stage), so that substantially a negative self-biasing voltage can be applied. An etching speed of the W film under the above conditions is about 100 nm/min. In the first etching process, a time period required for the W film to be just etched away is calculated based on the above-mentioned etching speed, and the resultant time period is increased by 20% to be set as the actual etching time period.

Conductive layers 518 to 523 having a first tapered shape are formed through the first etching process. The tapered angle of 15 to 30 degrees can be obtained. In order to perform the etching process without remaining any etching residue, overetching is performed in which an etching time is increased by 10 to 20%. A selection ratio of the silicon oxynitride film (the gate insulating film 509 having the first shape) with respect to the W film is about 2 to 4 (typically 3), and therefore, the exposed surface of the silicon oxynitride film can be etched away by about 20 to 50 nm through the overetching, so that a gate insulating film 580 can be formed to have a second shape in which tapered shapes are formed in the vicinity of end portions of the conductive layer 518 to 523 having the first tapered shape.

Thereafter, a first doping process is performed so that impurity elements with one conductivity type are added into the island-shaped semiconductor layers. In this embodiment, the impurity elements providing the n-type conductivity are added. The masks 512 to 517 used for forming the first-shaped conductive layers are remained, and the conductive layers 518 to 523 having the first tapered shapes are used as masks so that the impurity elements for providing the n-type conductivity are added with the ion doping method in a self-aligning manner. In order that the impurity elements for providing the n-type conductivity are added so as to pass through the tapered portion and the second shape gate insulating film 580 at the end portion of the gate electrode and reach the underlying semiconductor layer, the dosage is set in the range from $1\times10^{13}$ to $5\times10^{14}$ atoms/cm$^2$ and the accelerating voltage is set in the range from 80 to 160 keV. As the impurity elements for providing the n-type conductivity, elements in Group 15 in the periodic table, typically phosphorus (P) or arsenic (As), can be used. In this embodiment, phosphorus (P) is used. Through the above-described ion doping method, the impurity elements for providing the n-type conductivity are added to first impurity regions 524 to 528 in the concentration range from $1\times10^{20}$ to $1\times10^{21}$ atoms/cm$^3$, while the impurity elements for providing the n-type conductivity are added to a second impurity regions (A) 529 to 533 formed below the tapered portions in the concentration range from $1\times10^{17}$ to $1\times10^{20}$ atoms/cm$^3$, although not necessarily uniformly added in the regions. (See FIG. 20A.)

In this process, in the second impurity regions (A) 529 to 533, the concentration profiles of the impurity elements for providing the n-type conductivity to be contained in at least portions overlapping with the first-shaped conductive layers 518 to 523 reflect changes in the film thickness of the tapered portions. More specifically, the concentration of phosphorus (P) to be added into the second impurity regions (A) 529 to 533 in the regions overlapping with the first-shaped conductive layers 518 to 523 is gradually reduced inwardly from the end portion of the conductive layer. This is because the concentration of phosphorus (P) that can reach the semiconductor layer is changed depending on differences in the film thickness of the tapered portions.

Figures 20A, 20B, 20C:
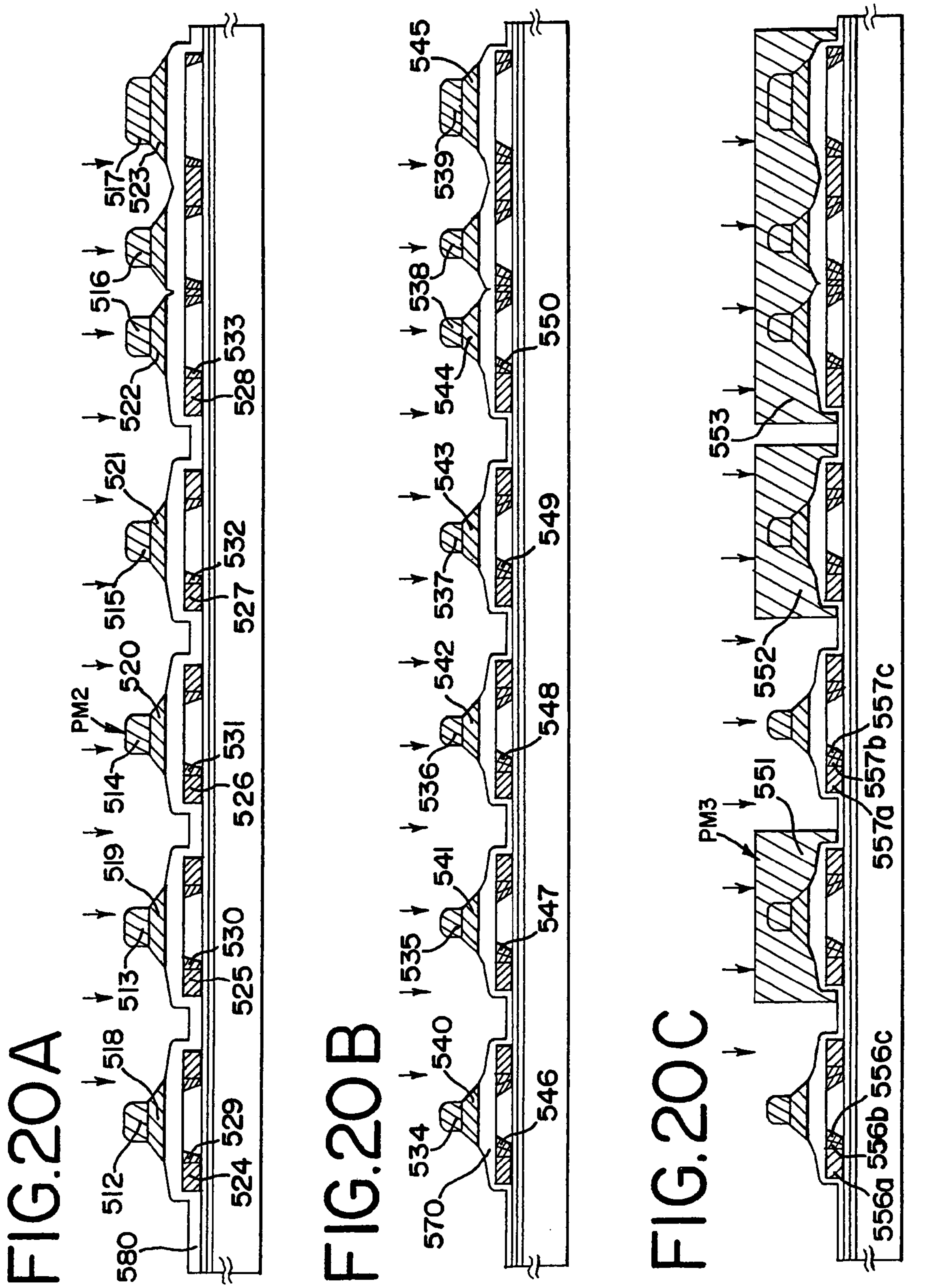
FIGS. 20A to 20C are diagrams showing the process of manufacturing the semiconductor display device.

Then, as shown in FIG. 20B, a second etching process is performed. This etching process is similarly performed with the ICP etching apparatus by employing a mixture gas of $CF_4$ and $Cl_2$ as an etching gas under the conditions of an applied RF power of 3.2 W/cm$^2$ (13.56 MHz) and a bias power of 45 mW/cm$^2$ (13.56 MHz) under a pressure of 1.0 Pa. Thus, conductive layers 540 to 545 are formed to have a second shape obtainable under these conditions. Tapered portions are formed at respective end portions thereof, in which a thickness is gradually increased inwardly from the respective end portions. As compared with the first etching process, an isotropic etching component is increased due to a reduction in the bias power to be applied to the substrate side, so that the tapered portions are formed to have an angle of 30 to 60 degrees. The masks 512 to 517 are shaved the periphery potion by an etching, and then it will be as the masks 534 to 539. In addition, the surfaces of the gate insulating films 580 having the second shape are etched away by about 40 nm, and third gate insulating films 570 are newly formed.

Thereafter, the impurity elements for providing the n-type conductivity are doped with a reduced dosage at a higher accelerating voltage, as compared to the first doping process. For example, the accelerating voltage is set in the range from 70 to 120 keV and the dosage is set at $1\times10^{13}$ atoms/cm$^2$. The concentrations of the impurity elements to be included in the regions overlapping with the conductive layers 540 to 545 having the second shape are set to be in the range from $1\times10^{16}$ to $1\times10^{18}$ atoms/cm$^3$. Thus, the second impurity regions (B) 546 to 550 are formed.

Then, impurity regions 556 and 557 with the opposite conductivity are formed in the island-shaped conductive layers 504 and 506 that constitute p-channel TFTs. The impurity elements for providing the p-type conductivity are doped with the second-shaped conductive layers 540 and 542 as masks to form the impurity regions in a self-aligning manner. In this case, the island-shaped semiconductor layers 505, 507, 508 that constitute the n-channel TFTs are entirely covered with resist masks 551 to 553 formed by employing a third photomask (PM3). The impurity regions 556 and 557 in this stage are formed with the ion doping method employing diborane ($B_2H_6$). The concentrations of the impurity elements for providing the p-type conductivity in the impurity regions 556 and 557 are set in the range from $2\times10^{20}$ to $2\times10^{21}$ atoms/cm$^3$.

However, these impurity regions 556 and 557 when viewed in more detail can be divided into three regions containing the impurity elements for providing the n-type conductivity. More specifically, third impurity regions 556*a* and 557*a* contain the impurity elements for providing the n-type conductivity in the range from $1\times10^{20}$ to $1\times10^{21}$ atoms/cm$^3$, fourth impurity regions (A) 556*b* and 557*b* contain the impurity elements for providing the n-type conductivity in the range from $1\times10^{17}$ to $1\times10^{20}$ atoms/cm$^3$, and the fourth impurity regions (B) 556*c* and 557*c* contain the impurity elements for providing the n-type conductivity in the range from $1\times10^{16}$ to $5\times10^{18}$ atoms/cm$^3$. However, when the concentrations of the impurity elements for providing the p-type conductivity are set to be at $1\times10^{19}$ atoms/cm$^3$ or more in the impurity regions 556*b*, 556*c*, 557*b*, and 557*c*, and the concentrations of the impurity elements for providing the p-type conductivity are set to become 1.5 to 3 times larger in the third impurity regions 556*a* and 557*a*, no adverse problems occur for allowing the third impurity regions to function as source and drain regions of the p-channel TFTs. In addition, portions of the fourth impurity regions (B) 556*c* and 557*c* are formed to overlap with the conductive layer 540 or 542 having the second tapered shape.

Figure 21A:
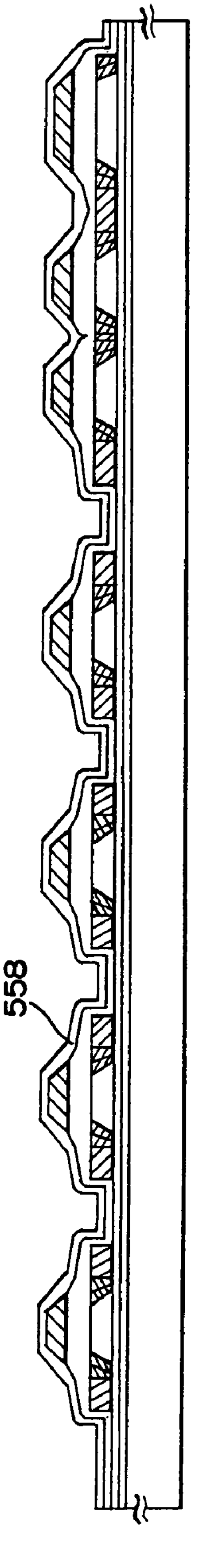
FIGS. 21A and 21B are diagrams showing the process of manufacturing the semiconductor display device.

Thereafter, as shown in FIG. 21A, a first interlayer insulating film 558 is formed over the conductive layers 540 to 545 and the gate insulating film 570. The first interlayer insulating film 558 may be formed of a silicon oxide film, a silicon nitride film, a silicon oxynitride film, or a layered film in which these films are combined. In either case, the first interlayer insulating film 558 is formed of an inorganic insulating material. The film thickness of the first interlayer insulating film 558 is set to be in the range from 100 to 200 nm. When a silicon oxide film is to be employed, the film is formed with the plasma CVD method in which TEOS and $O_2$ are mixed to each other, and the discharge is generated under the conditions of a reaction pressure of 40 Pa, a substrate temperature in the range of 300 to 400° C., and a high frequency (13.56 MHz) power density of 0.5 to 0.8 W/cm$^2$. When a silicon oxynitride film is to be employed, as the first interlayer insulating film 558 the film is formed of a silicon oxynitride film formed with the plasma CVD method from $SiH_4$, $N_2O$, and $NH_3$, or a silicon oxynitride film formed with the plasma CVD method from $SiH_4$ and $N_2O$. The film formation conditions in these cases are set as follows: a reaction pressure in the range from 20 to 200 Pa, a substrate temperature in the range of 300 to 400° C., and a high frequency (60 MHz) power density of 0.1 to 1.0 W/cm$^2$. Alternatively, a hydrogenated silicon oxynitride film formed from $SiH_4$, $N_2O$, and $H_2$ may also be used as the first interlayer insulating film 558. A silicon nitride film can also be formed with a plasma CVD method from $SiH_4$ and $NH_3$.

Then, a process for activating the impurity elements providing the p-type and n-type conductivities added at the respective concentrations is performed. This process is realized as a thermal annealing method which employs a furnace anneal oven. Alternatively, a laser annealing method, or a rapid thermal annealing method (RTA method) may be applied for that purpose. The thermal annealing is performed within a nitrogen atmosphere having the oxygen concentration of 1 ppm or lower, preferably 0.1 ppm or lower, at 400 to 700° C., typically 500 to 600° C. In this embodiment, the thermal annealing is performed at 550° C. for 4 hours. In the case where a plastic substrate having a low heating endurance temperature is employed for the substrate 501, a laser annealing method is preferably employed.

After the activation process, the surrounding atmospheric gases are switched to a hydrogen atmosphere containing hydrogens at the concentration of 3 to 100%. A heat process is performed in this atmosphere at 300 to 450° C. for 1 to 12 hours so that the island-shaped semiconductor layers are hydrogenated. In this process, dangling bonds existing in the island-shaped semiconductor layers at the concentration of $10^{16}$ to $10^{18}$/cm$^3$ are terminated with thermally excited hydrogens. As another means for the hydrogenation, plasma hydrogenation (in which hydrogens excited by means of plasma are employed) may be performed. In either case, the defect densities in the island-shaped semiconductor layers 504 to 508 are preferably set to be at $10^{16}$/cm$^3$ or lower. For that purpose, hydrogens in the island-shaped semiconductor layers are added at the concentration of about 0.01 to 0.1 atomic %.

Then, a second interlayer insulating film 559 made of an organic insulating material is formed from 1.0 to 2.0 μm. As the organic insulating material, polyamide, accrual, polyimide, polyimideamide, BCB (benzocyclobutene), or the like may be used. Here, polyamide of the type that is thermally polymerized after being applied to the substrate is used, and the film is formed by carrying out baking at 300° C. In the case where an acrylic resin is to be used, a two-liquid type material is used. A main component and a curing agent are mixed and the resultant mixture is applied onto the entire substrate by a spinner, and thereafter, a preliminary heating at 80° C. for 60 seconds is performed with a hot plate and the baking is further performed in a clean oven at 250° C. for 60 minutes.

By thus forming the second interlayer insulating film 559 of an organic insulating material, the surface thereof can be easily planarized. In addition, since the organic resign material has in general a low dielectric constant, a parasitic capacitance can be reduced. However, the organic insulating material tends to absorb water, and therefore, is not suitable for the use as a protective film. Accordingly, as in this embodiment, it is preferable to combine the organic insulating film with a silicon oxide film, a silicon oxynitride film or a silicon nitride film formed as the first interlayer insulating film 558.

Thereafter, a resist mask having a predetermined pattern is formed by employing a fourth photomask (PM4) to form contact holes that reach the respective impurity regions formed in the island-shaped semiconductor layers so as to function as a source or drain region. These contact holes are formed with a dry etching method. In this case, a mixture gas of $CF_4$, $O_2$, and He is used as an etching gas to first etch away the second interlayer insulating film 559 made of the organic insulating material. The first interlayer insulating film 558 is then etched away with a mixture gas of $CF_4$ and $O_2$ as an etching gas. Furthermore, the etching gas is switched to $CHF_3$ so as to enhance a selection ratio with respect to the island-shaped semiconductor layers, and the gate insulating films 570 having the third shape are etched away, thereby resulting in the contact holes being formed.

Thereafter, a conductive metal film is formed with a sputtering method or a vacuum evaporation method. A resist mask pattern is formed by employing a fifth photomask (PM5), and another etching process is performed to form source wirings 560 to 564 and drain wirings 565 to 568. A pixel electrode 569 can be formed simultaneously with the drain wirings. A pixel electrode 571 represents the one belonging to the adjacent pixel. Although not illustrated, the wirings in this embodiment are formed as follows. A Ti film having a thickness of 50 to 150 nm is formed to be in contact with the impurity regions in the island-shaped semiconductor layers functioning as the source/drain regions. Aluminum (Al) films with a thickness of 300 to 400 nm are overlaid on the Ti films, and further transparent conductive films with a thickness of 80 to 120 nm are overlaid thereon. As the transparent conductive films, an indium-oxide-zinc-oxide alloy ($In_2O_3$—ZnO) and zinc oxide (ZnO) are also suitable materials. Moreover, zinc oxide having gallium (Ga) added thereto (Zno:Ga) for improving a transmittance of visible lights or an electrical conductivity may be advantageously used.

Thus, by employing five photomasks, a substrate in which the TFT in the driver circuit (source signal line driver circuit and gate signal line driver circuit) and the pixel TFT in the pixel portion are formed on the identical substrate can be provided. In the driver circuit, a first p-channel TFT 600, a first n-channel TFT 601, a second p-channel TFT 602, and a second n-channel TFT 603 are formed, while a pixel TFT 604 and a storage capacitance 605 are formed in the pixel portion. In the present specification, such a substrate is referred to as an active matrix substrate for the purpose of convenience.

In the first p-channel TFT 600 in the driver circuit, the conductive layer having the second tapered shape functions as its gate electrode 620. Moreover, the TFT 600 has the structure in which there are provided within the island-shaped semiconductor layer 504, a channel forming region 606, a third impurity region 607*a* to function as a source or drain region, a fourth impurity region (A) 607*b* for forming an LDD region not overlapping with the gate electrode 620, and another fourth impurity region (B) 607*c* for forming an LDD region partially overlapping with the gate electrode 620.

In the first n-channel TFT 601, the conductive layer having the second tapered shape functions as its gate electrode 621. Moreover, the TFT 601 has the structure in which there are provided within the island-shaped semiconductor layer 505, a channel forming region 608, a first impurity region 609*a* to function as a source or drain region, a second impurity region (A) 609*b* for forming an LDD region not overlapping with the gate electrode 621, and another second impurity region (B) 609*c* for forming an LDD region partially overlapping with the gate electrode 621. A channel length is set in the range from 2 to 7 μm, while an overlapping length of the second impurity region (B) 609*c* with the gate electrode 621 is set in the range from 0.1 to 0.3 μm This overlapping length Lov is controlled through the thickness of the gate electrode 621 as well as an angle of the tapered portion. By forming such an LDD region in the n-channel TFT, a high electrical field to be otherwise generated in the vicinity of the drain region can be mitigated, so that hot carriers are prevented from being generated, thereby resulting in prevention of deterioration of the TFT.

The second p-channel TFT 602 in the driver circuit similarly has the conductive layer having the second tapered shape, which functions as its gate electrode 622. Moreover, the TFT 602 has the structure in which there are provided within the island-shaped semiconductor layer 506, a channel forming region 610, a third impurity region 611*a* to function as a source or drain region, a fourth impurity region (A) 611*b* for forming an LDD region not overlapping with the gate electrode 622, and another fourth impurity region (B) 611*c* for forming an LDD region partially overlapping with the gate electrode 622.

The second n-channel TFT 603 in the driver circuit has the conductive layer having the second tapered shape which functions as its gate electrode 623. Moreover, the TFT 603 has the structure in which there are provided within the island-shaped semiconductor layer 507, a channel forming region 612, a first impurity region 613*a* to function as a source or drain region, a second impurity region (A) 613*b* for forming an LDD region not overlapping with the gate electrode 623, and another second impurity region (B) 613*c* for forming an LDD region partially overlapping with the gate electrode 623. Similarly with the second n-channel TFT 601, an overlapping length of the second impurity region (B) 613*c* with the gate electrode 623 is set in the range from 0.1 to 0.3 μm.

Figure 21B:
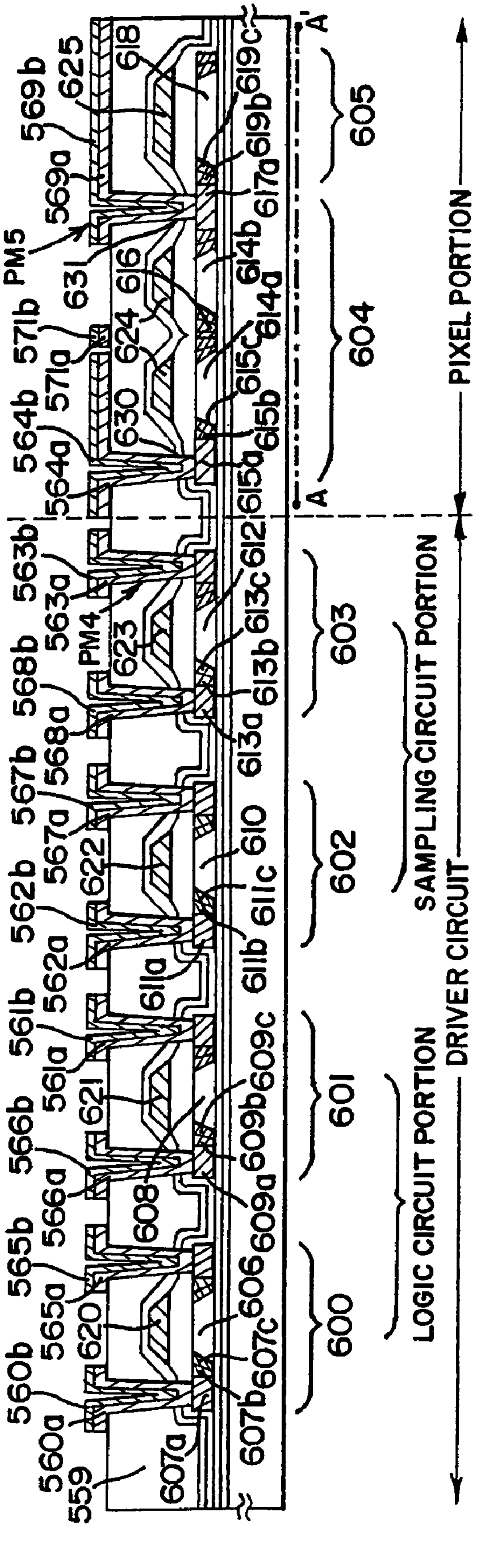

The driver circuit is composed of logic circuits such as a buffer circuit, the shift resister circuits or the like, as well as a sampling circuit formed of an analog switch, or the like. In FIG. 21B, the TFTs for forming these circuits are illustrated to have a single-gate structure in which only one gate electrode is provided between a pair of source and drain regions. However, a multigate structure in which a plurality of gate electrodes are provided between a pair of source and drain regions may also be used.

The pixel TFT 604 has the conductive layer having the second tapered shape which functions as its gate electrode 624. Moreover, the pixel TFT 604 has the structure in which there are provided within the island-shaped semiconductor layer 508, channel forming regions 614*a* and 614*b*, first impurity regions 615*a*, 616, and 617*a* to function as source or drain regions, a second impurity region (A) 615*b* for forming an LDD region not overlapping with the gate electrode 624, and another second impurity region (B) 615*c* for forming an LDD region partially overlapping with the gate electrode 624. An overlapping length of the second impurity region (B) 613*c* with the gate electrode 624 is set in the range from 0.1 to 0.3 μm. In addition, a storage capacitor 605 is formed from a semiconductor layer extending from the first impurity region 617 and including a second impurity region (A) 619*b*, another second impurity region (B) 619*c*, and a region 618 into which no impurity elements for defining the conductivity type are added; an insulating layer formed on the same level as the gate insulating film having the third shape; and a capacitor wiring 625 formed by a conductive layer having the second tapered shaped.

In the pixel TFT 604, a gate electrode 624 intersects, through a gate insulating film 570, with the island-like semiconductor layer 508 formed below and stretches over a plurality of island-like semiconductor layers furthermore to serve as the gate signal line. The storage capacitor 605 is formed by a region in which the semiconductor layer extending from the drain region 617*a* of the pixel TFT 604 and the capacitor wiring 625 overlap, through the gate insulating file 570. An impurity element for controlling valence electrons is not added in the semiconductor layer 618 in this structure.

The above-described structure allows the structures of the respective TFTs to be optimized based on requirements required in the pixel TFT and the driver circuit, and further allows the operating performances and the reliability of the semiconductor device to be improved. Moreover, by forming a gate electrode with a conductive material having the sufficient heat-resistance capability, activation of the LDD region or the source/drain regions can be easily performed. Furthermore, by forming the LDD region with a gradient in the concentration of impurity elements added for the purpose of controlling the conductivity type when forming the LDD region overlapping with the gate electrode via the gate insulating film, an effect of mitigating an electrical field, especially in the vicinity of the drain region, can be expected to be enhanced.

In the case of the active matrix liquid crystal display device, the first p-channel TFT 600 and the first n-channel TFT 601 are used for forming circuits required to operate at a high speed, such as a shift register circuit, a buffer circuit, or a level shifter circuit. In FIG. 21B, these circuits are expressed as a logic circuit portion. The second impurity region (B) 609*c* of the first n-channel TFT 601 has a structure in which the countermeasure against hot carriers is emphasized. Moreover, in order to improve breakdown characteristics and stabilize operations, the TFT in the logic circuit portion may be formed TFT which has a double-gate structure having two gate electrodes between a pair of source/drain regions, and can be similarly fabricated in accordance with the fabrication process in the present embodiment.

In the sampling circuit composed of the analog switches, the second p-channel TFT 602 and the second n-channel TFT 603 having the similar structures can be applied. Since the countermeasure against hot carriers, as well as realization of a low OFF current operation, are important for the sampling circuit, the second p-channel TFT 602 has a triple-gate structure in which three gate electrodes are provided between a pair of source/drain regions, and can be similarly fabricated in accordance with the fabrication process in the present embodiment. A channel length is set in the range from 3 to 7 μm, and an overlapping length Lov in the channel length direction of the LDD region overlapping with the gate electrode is set in the range from 0.1 to 0.3 μm.

Thus, whether the gate electrode of the TFT should be a single-gate structure or a multigate structure in which a plurality of gate electrodes are provided between a pair of source/drain regions, may be appropriately selected depending on the required characteristics of the circuit.

Figures 22A, 22B:
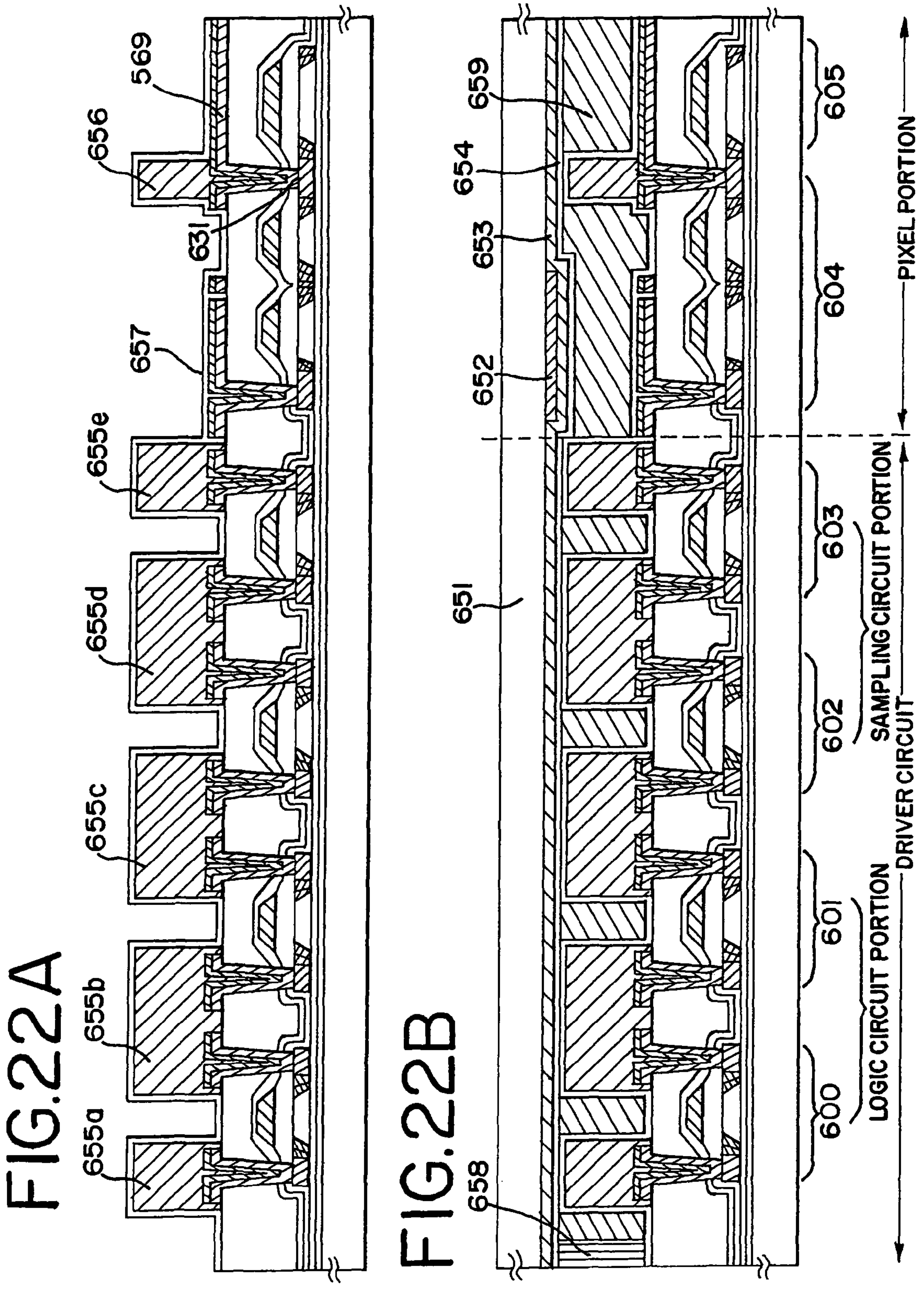
FIGS. 22A and 22B are diagrams showing the process of manufacturing the semiconductor display device.

Then, as shown in FIG. 22A, a spacer which is a cylindrical spacer is formed on the active matrix substrate of a state shown in FIG. 21B. The spacer may be formed by sprinkling particles of a size of several microns. Here, however, the spacer is formed by forming a resin film on the whole surface of the substrate followed by patterning. Though not limited to the above material only, the spacer may be formed by, for example, applying NN700 manufactured by JSR Co. by using a spinner and exposing it to light and developing it to form in a predetermined pattern. The spacer is then cured by heating in a clean oven at 150° C. to 200° C. The thus formed spacer can be formed in different shapes by changing the conditions of exposure to light and developing. Desirably, however, the spacer is formed in a cylindrical shape with a flat top portion. When brought into contact with the substrate of the opposing side, then, the spacer works to maintain a mechanical strength needed for the liquid crystal display panel. The shape may be a conical shape, a pyramidal shape, or the like and there is no particular limitation on the shape. When the spacer is formed in a conical shape, however, the height may be 1.2 to 5 μm, the average radius may be 5 to 7 μm, and the ratio of the average radius to the radius of the bottom portion may be 1 to 1.5. In this case, the tapered angle of the side surface is not larger than ±15°.

The arrangement of the spacer may be arbitrarily determined. Desirably, however, the cylindrical spacer 656 is formed being overlapped on a contact portion 631 of the pixel electrode 569 in the pixel portion so as to cover this portion as shown in FIG. 22A. The contact portion 631 loses the flatness, and the liquid crystals are not favorably oriented in this portion. Therefore, the cylindrical spacer 656 is formed in a manner to fill the contact portion 631 with the spacer resin, thereby to prevent disclination in the vicinity of the spacer 656. Spacers 655*a* to 655*e* are also formed on the TFTs of the driver circuit. The spacers may be formed over the whole surface of the driver circuit portion or may be formed to cover the source wirings and the drain wirings as shown in FIG. 22A.

Then, an alignment film 657 is formed. Usually, a polyimide resin is used as an alignment film of the liquid crystal display element. After the alignment film is formed, the rubbing is effected so that the liquid crystal molecules are oriented acquiring a predetermined pre-tilted angle. The region that is not rubbed in the rubbing direction is suppressed to be not larger than 2 μm from the end of the cylindrical spacer 656 formed on the pixel portion. The generation of static electricity often becomes a problem in the rubbing treatment. However, the TFTs are protected from the static electricity due to the spacers 655*a* to 655*e* formed on the TFTs of the driver circuit. Though not shown in figure, the spacers 656, 655*a* to 655*e* may be formed after the alignment film 657 is formed.

On the opposing substrate 651 of the opposing side are formed a light-shielding film 652, a transparent conductive film 653 and an alignment film 654. The light-shielding film 652 is formed of a Ti film, a Cr film or an Al film with a thickness of 150 nm to 300 nm. The active matrix substrate on which the pixel portion and the driver circuit are formed, is stuck to the opposing substrate with a sealing material 658. The sealing material 658 contains a filler (not shown), and the two substrates are stuck together maintaining a uniform gap due to the filler and the spacers 656, 655*a* to 655*e*. Thereafter, a liquid crystal material 659 is injected between the two substrates. The liquid crystal material may be a known material. For example, there can be used anti-ferroelectric mixed liquid crystals having no threshold value exhibiting a transmission factor that continuously changes relative to the electric field and exhibiting electro-optical response characteristics, in addition to using TN liquid crystals. Some anti-ferroelectric mixed liquid crystals with no threshold value may exhibit V-shaped electro-optical response characteristics. The active matrix-type liquid crystal display device shown in FIG. 22B is thus completed.

The TFT formed by the manufacturing method of the present invention is extremely effective for the semiconductor display device of the present invention which needs faster response rate because of the semiconductor layer having a high crystallinity.

The method of manufacturing a semiconductor display device in accordance with the present invention is not limited to this method disclosed in the present embodiment. The semiconductor display device of the present invention can be fabricated in accordance with a known method.

Note that Embodiment 7 can be freely combined with Embodiments 1 to 5.

Embodiment 8

The present invention can be used in various liquid crystal panels. In other words, the present invention can be applied to all of the semiconductor display devices (electronic equipments) having these liquid crystal panels (active matrix type liquid crystal display) as a display medium.

Such electronic equipments include a video camera, a digital camera, a projector (a rear type or a front type), a head mount display (a goggle-type display), a game machine, a car navigation system, a personal computer, a portable information terminal (a mobile computer, a portable telephone, an electronic book, or the like), or the like. FIG. 23 shows an example of such electronic equipments.

Figure 23A:
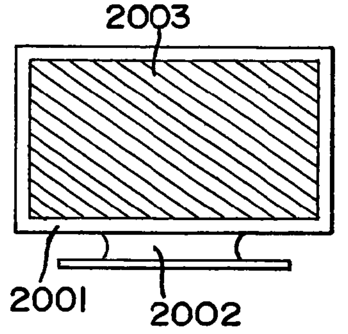
FIGS. 23A to 23F are diagrams of electronic devices applying the present invention.

FIG. 23A illustrates a display which includes a frame 2001, a support table 2002, a display portion 2003, or the like. The present invention can be applied to the display portion 2003.

Figure 23B:
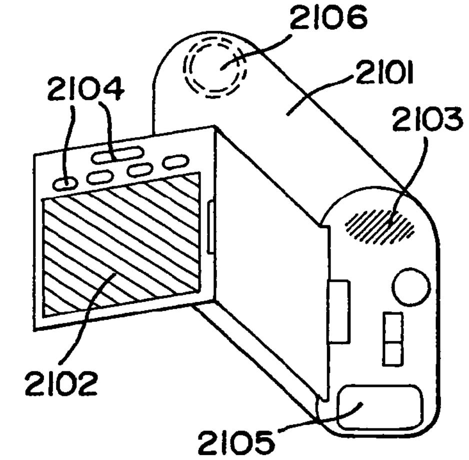

FIG. 23B illustrates a video camera which includes a main body 2101, a display portion 2102, an audio input portion 2103, operation switches 2104, a battery 2105, an image receiving portion 2106. The present invention can be applied to the display portion 2102.

Figure 23C:
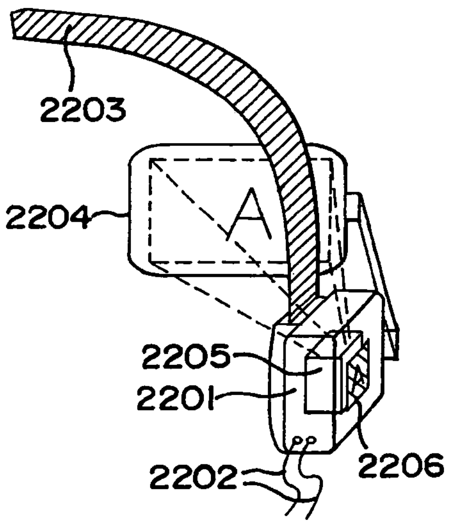

FIG. 23C illustrates a portion (the right-half piece) of a head mount type display, which includes a main body 2201, signal cables 2202, a head mount band 2203, a screen portion 2204, an optical system 2205, a display portion 2206, or the like. The present invention can be applied to the display portion 2206.

Figure 23D:
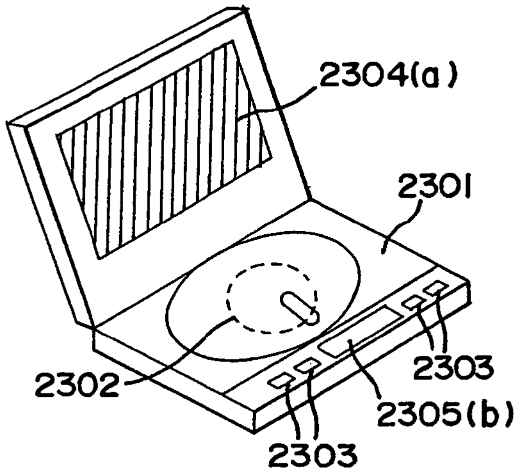

FIG. 23D illustrates an image reproduction apparatus which includes a recording medium (specifically, a DVD reproduction apparatus), which includes a main body 2301, a recording medium (a DVD or the like) 2302, operation switches 2303, a display portion (a) 2304, another display portion (b) 2305, or the like. The display portion (a) 2304 is used mainly for displaying image information, while the display portion (b) 2305 is used mainly for displaying character information. The semiconductor display device in accordance with the present invention can be used as these display portions (a) 2304 and (b) 2305. The image reproduction apparatus including a recording medium further includes a game machine or the like.

Figure 23E:
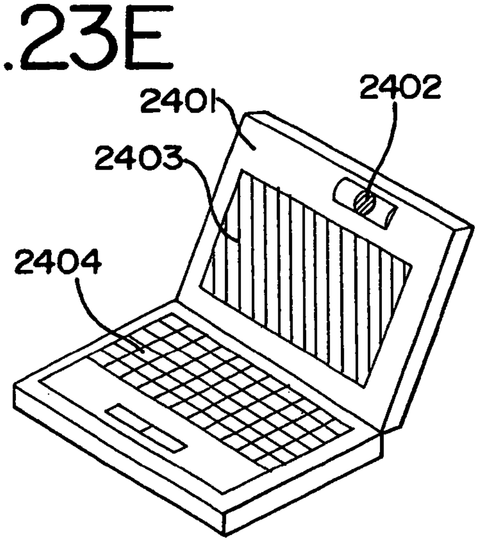

FIG. 23E illustrates a personal computer which includes a main body 2401, an image inputting portion 2402, a display portion 2403, a keyboard 2404, or the like. The present invention can be applied to the image inputting portion 2402 and the display portion 2403.

Figure 23F:
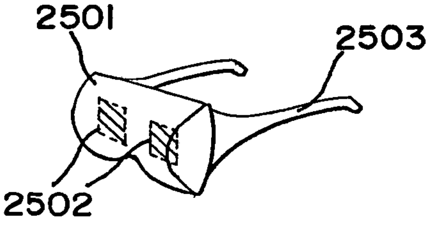

FIG. 23F illustrates a goggle type display which includes a main body 2501, a display portion 2502, and an arm portion 2503. The present invention can be applied to the display portion 2502.

The applicable range of the present invention is thus extremely wide, and it is possible to apply the present invention to electronic equipments in all fields. Also, the electronic equipments in the present embodiment can be obtained by utilizing the configuration in which the structures in Embodiments 1 through 7 are freely combined.

Embodiment 9

The present invention can be applied to a projector (rear projection type or front projection type). Examples of such projectors are shown in FIGS. 24A to 24D, and in FIGS. 25A to 25C.

Figure 24A:
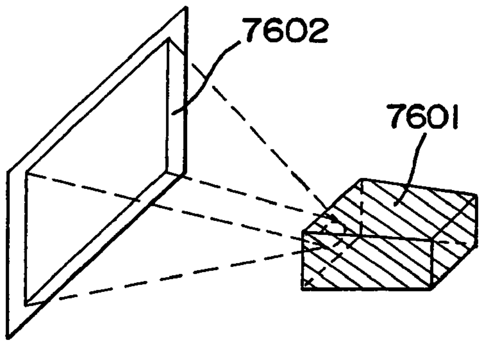
FIGS. 24A to 24D are diagrams of projectors applying the present invention.

FIG. 24A is a front projector, and is structured by a light source optical system and display device 7601, and a screen 7602. The present invention can be applied to the display device 7601.

Figure 24B:
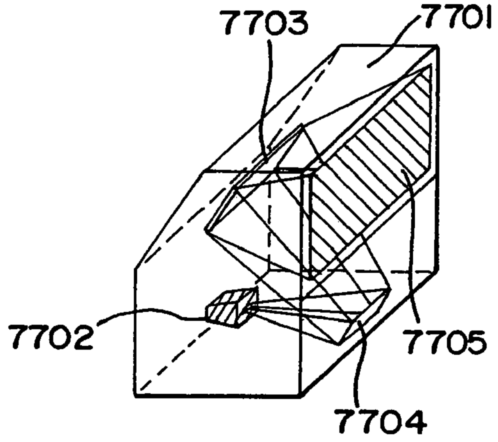

FIG. 24B is a rear projector, and is structured by a main body 7701, a light source optical system and display device 7702, a mirror 7703, a mirror 7704, and a screen 7705. The present invention can be applied to the display device 7702.

Figure 24C:
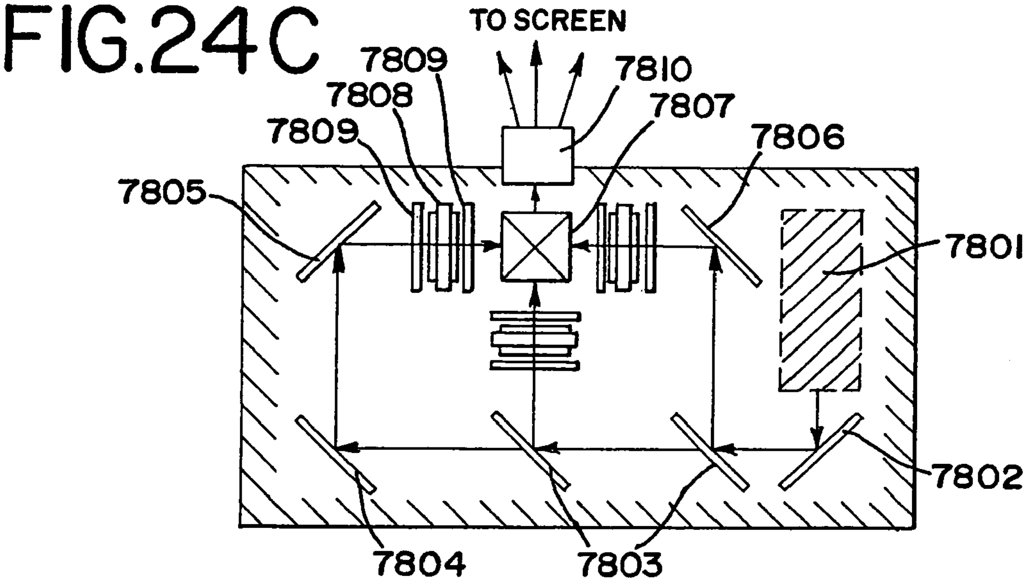

Note that an example of the structure of the light source optical system and display devices 7601 and 7702 of FIG. 24A and FIG. 24B is shown in FIG. 24C. The light source optical system and display devices 7601 and 7702 are composed of a light source optical system 7801, mirrors 7802 and 7804 to 7806, a dichroic mirror 7803, an optical system 7807, a display device 7808, a phase difference plate 7809, and a projecting optical system 7810. The projecting optical system 7810 is composed of a plurality of optical lenses prepared with projecting lenses. This structure is referred to as a three plate type for using three of the display devices 7808. Further, an optical lens, a film having a light polarizing function, a film for regulating the phase difference, an IR film and the like may be suitably placed in the optical path shown by the arrow in FIG. 24C by the operator.

Figure 24D:
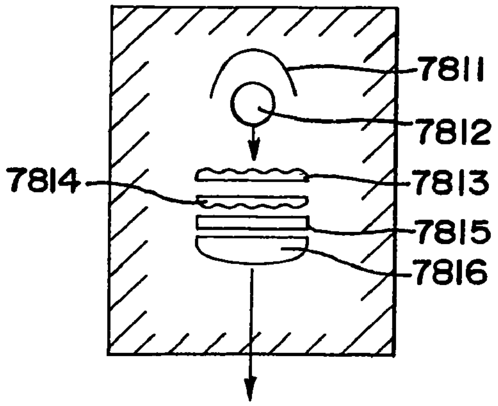

FIG. 24D is a diagram showing one example of a structure of the light source optical system 7801 in FIG. 24C. In Embodiment 9, the light source optical system 7801 is composed of a reflector 7811, a light source 7812, lens arrays 7813 and 7814, a polarizing transformation element 7815, and a condenser lens 7816. Note that the light source optical system shown in FIG. 24D is one example, and the light source optical system is not limited to the structure shown in the figure. For example, an optical lens, a film having a light polarizing function, a film for regulating the phase difference, and an IR film may be suitably added in the light source optical systems by the operator.

Figure 25A:
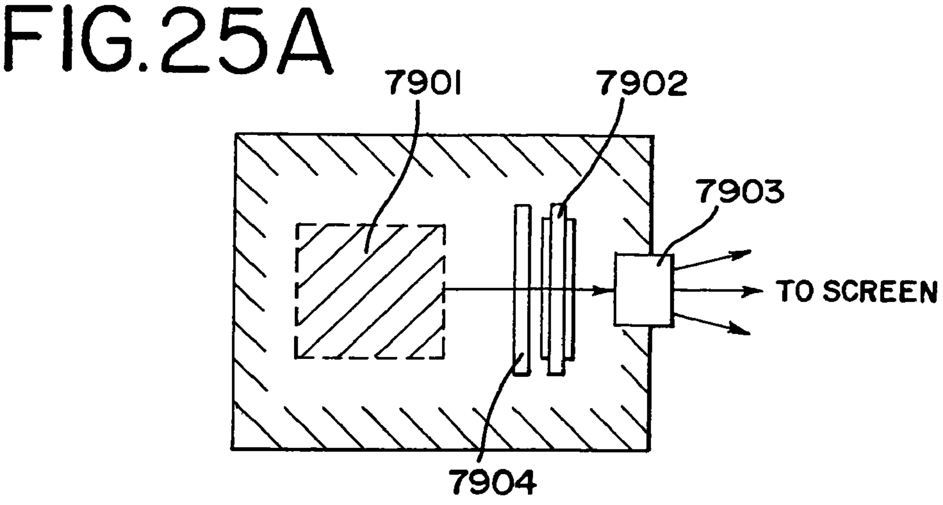
FIGS. 25A to 25C are diagrams of projectors applying the present invention.

An example of a three-plate type display is shown in FIG. 24C, and an example of a single plate type is shown in FIG. 25A. The light source optical system and display device shown in FIG. 25A is structured by a light source optical system 7901, a display device 7902, a projecting optical system 7903, and a phase difference plate 7904. The projecting optical system 7903 is structured by a plurality of optical lenses prepared with projecting lenses. The light source optical system and display device shown in FIG. 25A can be applied to the light source optical system and display devices 7601 and 7702 of FIGS. 24A and 24B, respectively. Further, as the light source optical system 7901, the light source optical system shown in FIG. 24D may also be used. Note that color filters (not shown in the figures) are formed in the display device 7902, whereby the display image is colorized.

Figure 25B:
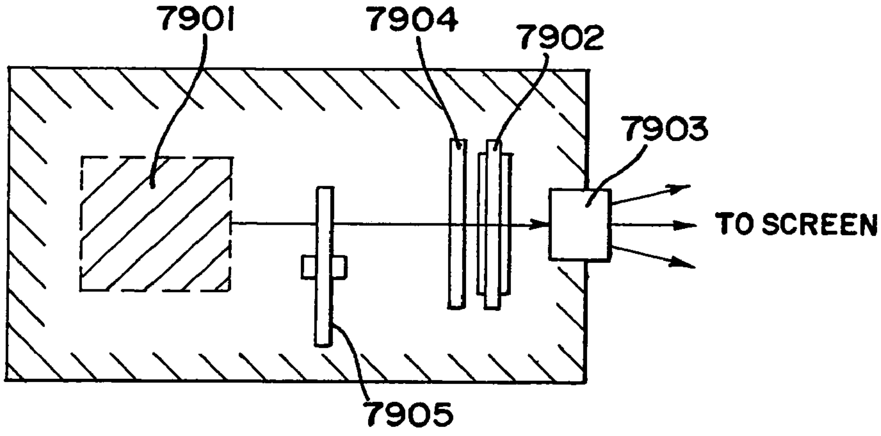

The light source optical system and display device shown in FIG. 25B is an applied example of FIG. 25A, and a displayed image is colorized using an RGB rotational color filter disk 7905 as a substitute for forming the color filters. The light source optical system and display device shown in FIG. 25B can be applied to the light source optical system and display devices 7601 and 7702 of FIGS. 24A and 24B, respectively.

Figure 25C:
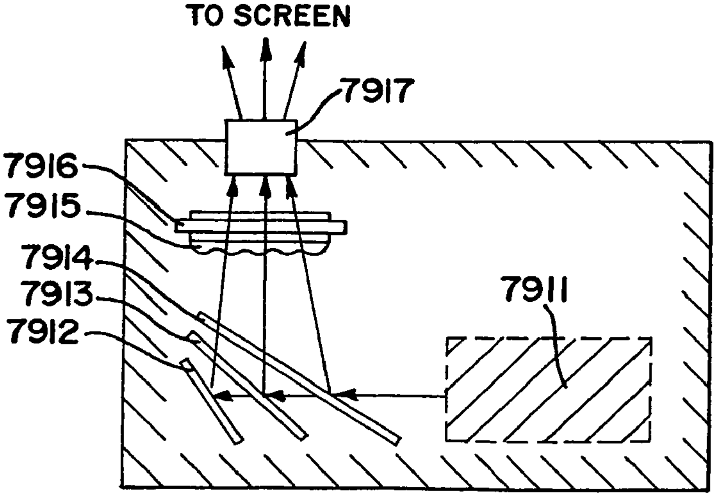
Figures 26A, 26B:
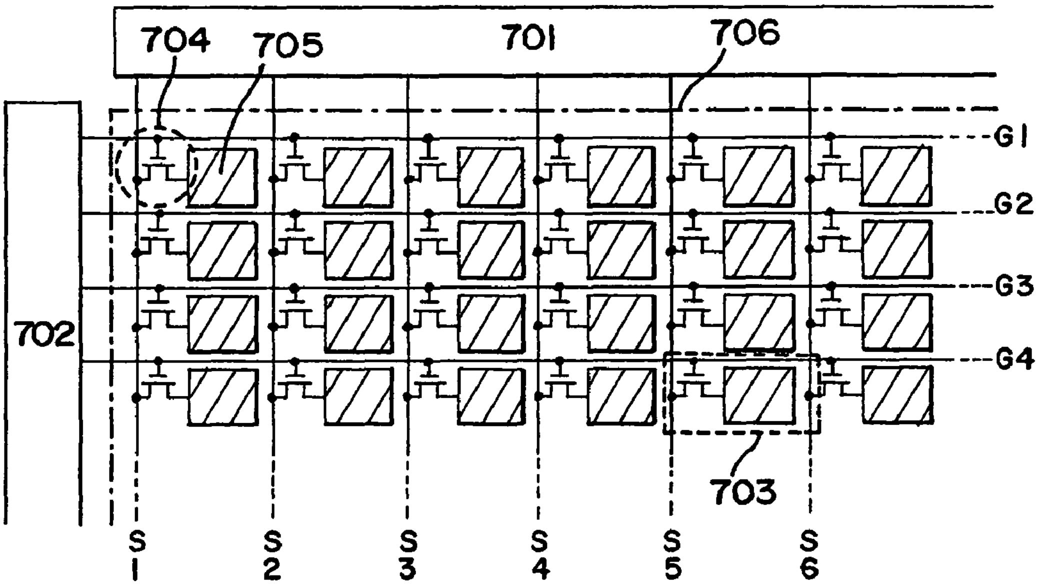
FIGS. 26A and 26B are a top surface diagram of an active matrix liquid crystal display device, and a diagram showing a pixel arrangement, respectively.
Figure 27A:
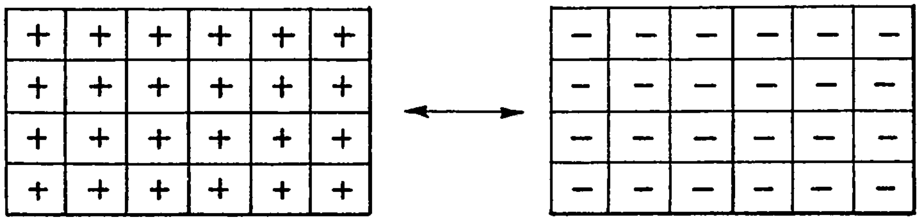
FIGS. 27A to 27D are diagrams showing electric potential patterns in alternating current drive.
Figure 27B:
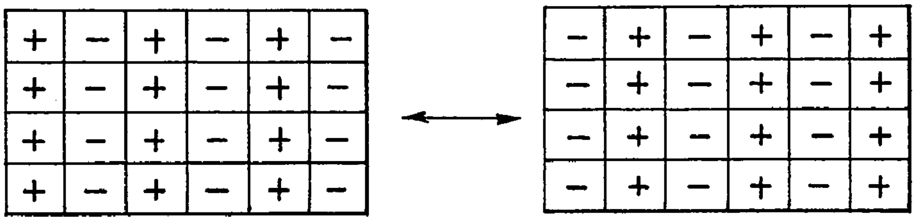
Figure 27C:
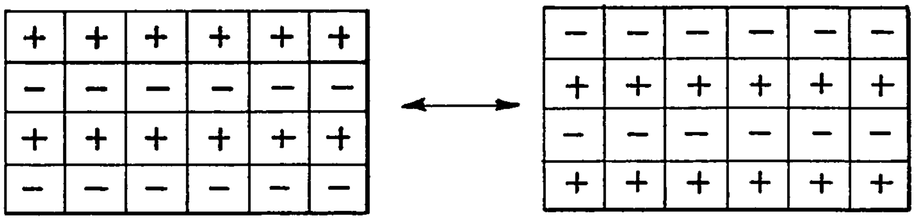
Figure 27D:
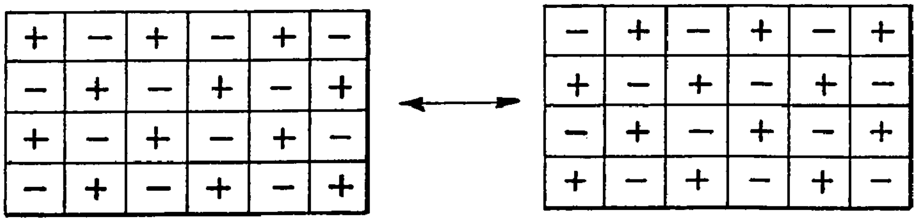
Figure 28:
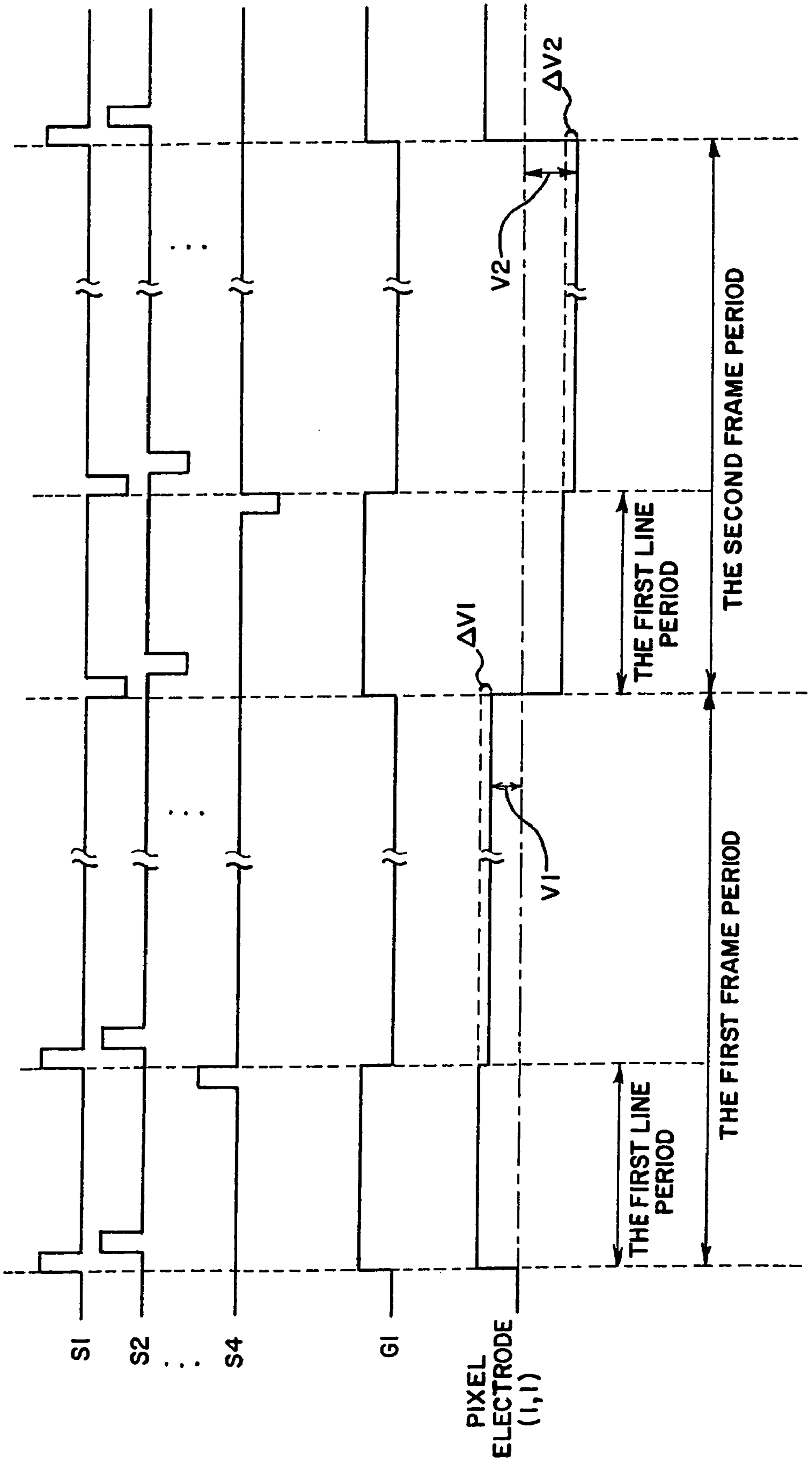
FIG. 28 is a timing chart of conventional frame inversion drive.

Further, the light source optical system and display device shown in FIG. 25C is referred to as a color filterless single plate method. A micro-lens array is formed in a display device 7916 with this method, and a display image is colorized using a dichroic mirror (green) 7912, a dichroic mirror (red) 7913, and a dichroic mirror (blue) 7914. A projecting optical system 7917 is structured by a plurality of optical lenses prepared with projecting lenses. The light source optical system and display device shown in FIG. 25C can be applied to the light source optical system and display devices 7601 and 7702 of FIGS. 24A and 24B, respectively. Further, an optical system using a combined lens and a collimator in addition to a light source may be used as the light source optical system 7911.

As stated above, the applicable range of the present invention is extremely wide, and it is possible to apply the present invention to electronic devices in all fields. Further, the electronic devices of Embodiment 9 can also be realized using a structure that combines any of Embodiments 1 to 7.

In accordance with the above structure, the frame frequency can be increased without increasing the frequency of the image signal input to an IC with the present invention, and therefore there is no load placed on electronic equipment which generates the image signal, and clear display of a high definition image can be performed with flicker, vertical stripes, horizontal stripes, and diagonal stripes being made less likely to be seen by an observer.

Further, by using frame inversion in particular with the present invention, the generation of stripes due to the phenomenon referred to as disclination between adjacent pixels can be suppressed, and a reduction in the brightness of the overall display screen can be prevented.

In addition, the electric potentials of the display signals input to each pixel in every set of two consecutive frame periods are inverted, with the electric potential of the opposing electrodes (opposing electric potential) as a reference, and therefore the same image is displayed in the pixel portion. The time average of the potentials of the display signals input to each pixel therefore become very close to the opposing electric potential, and this is effective in preventing liquid crystal degradation compared with a case of inputting different display signals to each pixel in each frame period.

What is claimed is:

1. A semiconductor display device comprising:

a pixel portion having a plurality of pixels;

a source signal line driver circuit; and a frame rate conversion portion, wherein:

each of the plurality of pixels has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are input to the source signal line driver circuit;

two display signals are generated by the source signal line driver circuit;

the two display signals have mutually inverted polarities;

the two generated display signals are input to the pixel electrodes through the switching elements; and a period in which one digital image signal is written into the one RAM or is written into one of the plurality of RAMs is longer than a period during which the written in digital image signal is read out a first time, and longer than a period during which the written in digital image signal is read out a second time.

2. A semiconductor display device comprising:

a pixel portion having a plurality of pixels;

a source signal line driver circuit; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the switching elements; and a period in which one digital image signal is written into the one RAM or is written into one of the plurality of RAMs is longer than a period during which the written in digital image signal is read out a first time, and longer than a period during which the written in digital image signal is read out a second time.

3. A semiconductor display device comprising:

a pixel portion having a plurality of pixels;

a source signal line driver circuit; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are input to the source signal line driver circuit;

two display signals are generated by the source signal line driver circuit;

the two display signals have mutually inverted polarities;

the two generated display signals are input to the pixel electrodes through the switching elements;

within each frame period, all of the display signals input to the pixel electrodes have the same polarity, with an electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

4. A semiconductor display device comprising:

a pixel portion having a plurality of pixels;

a source signal line driver circuit; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the switching elements;

within each frame period, all of the display signals input to the pixel electrodes have the same polarity, with an electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

5. A semiconductor display device comprising:

a pixel portion having a plurality of pixels;

a source signal line driver circuit;

a plurality of source signal lines; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are input to the source signal line driver circuit;

two display signals are generated by the source signal line driver circuit;

the two display signals have mutually inverted polarities;

the two generated display signals are input to the pixel electrodes through the plurality of source signal lines and through the switching elements;

within each frame period: display signals having mutually inverse polarities, with an electric potential of the opposing electrode as a reference, are input to source signal lines adjacent to the plurality of source signal lines; and the display signals input to the plurality of source signal lines always have the same polarity, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

6. A semiconductor display device comprising:

a pixel portion having a plurality of pixels;

a source signal line driver circuit;

a plurality of source signal lines; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMS;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are both converted into analog signals in a D/A converter circuit and then input to the source signal line driver circuit;

two display signals are generated by the source signal line driver circuit;

the two display signals have mutually inverted polarities;

the two generated display signals are input to the pixel electrodes through the plurality of source signal lines and through the switching elements;

within each frame period: display signals having mutually inverse polarities, with an electric potential of the opposing electrode as a reference, are input to source signal lines adjacent to the plurality of source signal lines; and the display signals input to the plurality of source signal lines always have the same polarity, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

7. A semiconductor display device comprising:

a pixel portion having a plurality of pixels;

a source signal line driver circuit;

a plurality of source signal lines; and a frame rate conversion portion, wherein:

the plurality of pixels each has: a switching element; a pixel electrode; and an opposing electrode;

the frame rate conversion portion has a data format portion and one RAM, or a plurality of digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are input to the source signal line driver circuit;

two display signals are generated by the source signal line driver circuit;

the two display signals have mutually inverted polarities;

the two generated display signals are input to the pixel electrodes through the plurality of source signal lines and through the switching elements;

within each line period, the display signals input to all of the plurality of source signal lines always have the same polarity, with an electric potential of the opposing electrode as a reference;

the polarities of the display signals input to the plurality of resource source signal lines are mutually inverted in adjacent line periods, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

8. A semiconductor display device comprising:

a pixel portion having a plurality of pixels;

a source signal line driver circuit; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMS, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the switching elements;

within each line period, the display signals input to all of the plurality of source signal lines always have the same polarity, with an electric potential of the opposing electrode as a reference;

the polarities of the display signals input to the plurality of source signal lines are mutually inverted in adjacent line periods, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

9. A semiconductor display device comprising:

a pixel portion having a plurality of pixels;

a source signal line driver circuit;

a plurality of source signal lines; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are input to the source signal line driver circuit;

two display signals are generated by the source signal line driver circuit;

the two display signals have mutually inverted polarities;

the two generated display signals are input to the pixel electrodes through the switching elements;

display signals having mutually inverse polarities, with an electric potential of the opposing electrode as a reference, are input to source signal lines adjacent to the plurality of source signal lines within each frame period;

the polarities of the display signals input to the plurality of source signal lines are mutually inverted in adjacent line periods, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

10. A semiconductor display device comprising:

a pixel portion having a plurality of pixels;

a source signal line driver circuit;

a plurality of source signal lines; and a frame rate conversion portion, wherein:

the plurality of pixels each has: a switching element; a pixel electrode; and an opposing electrode;

the frame rate conversion portion has a data format portion and one RAM, or a plurality of RAMs;

digital image signals are written into the one RAM, or into one of the plurality of RAMs;

the digital image signals written into the one RAM, or into one of the plurality of RAMs, are each read out twice;

the digital image signals which are read out twice from the one RAM or from one of the plurality of RAMs are input to the data format portion;

one of the digital image signals undergoes data processing in the data format portion so that polarity of the one of the digital image signals is inverted;

the digital image signals output from the data format portion are both converted into analog signals in a D/A converter circuit, and then input to the source signal line driver circuit;

two display signals are generated by the source signal line driver circuit;

the two display signals have mutually inverted polarities;

the two generated display signals are input to the pixel electrodes through the switching elements;

display signals having mutually inverse polarities, with an electric potential of the opposing electrode as a reference, are input to source signal lines adjacent to the plurality of source signal lines within each frame period;

the polarities of the display signals input to the plurality of source signal lines are mutually inverted in adjacent line periods, with the electric potential of the opposing electrode as a reference; and a period in which one digital image signal is written into the one RAM or is written into one of the plurality of RAMs is longer than a period during which the written in digital image signal is read out a first time, and longer than a period during which the written in digital image signal is read out a second time.

11. The semiconductor display device according to any one of claims 1 to 10, wherein the RAM is an SRAM, a DRAM, or an SDRAM.

12. The semiconductor display device according to any one of claims 1 to 10, wherein the switching element is: a transistor formed using single crystal silicon; a thin film transistor formed using polycrystalline silicon; or a thin film transistor formed using amorphous silicon.

13. A computer using the semiconductor display device according to any one of claims 1 to 10.

14. A video camera using the semiconductor display device according to any one of claims 1 to 10.

15. A DVD player using the semiconductor display device according to any one of claims 1 to 10.

* * * * *

UNITED STATES PATENT AND TRADEMARK OFFICE

CERTIFICATE OF CORRECTION

PATENT NO. : 8,009,159 B2
APPLICATION NO. : 11/586281
DATED : August 30, 2011
INVENTOR(S) : Masaaki Hiroki et al.

It is certified that error appears in the above-identified patent and that said Letters Patent is hereby corrected as shown below:

In the Specification:

Column 9, Line 24; Change “RAMS” to --RAMs--.

Column 15, Line 21; Change “Signal” to --signal--.

Column 22, Line 64; Change “readout” to --read out--.

Column 23, Line 39; Change “a next is first read out period” to --a next first read out period--.

Column 25, Line 40; Change “readout” to --read out--.

Column 25, Line 57; Change “readout” to --read out--.

Column 38, Line 12; Change “resister” to --register--.

Column 38, Line 48; Change “file” to --film--.

In the Claims:

Claim 7, Column 47, Line 2; Change “resource source signal lines” to --source signal lines--.

Signed and Sealed this
Twenty-eighth Day of February, 2012

David J. Kappos
*Director of the United States Patent and Trademark Office*